(12) United States Patent
Waldspurger

(10) Patent No.: US 6,789,156 B1
(45) Date of Patent: Sep. 7, 2004

(54) CONTENT-BASED, TRANSPARENT SHARING OF MEMORY UNITS

(75) Inventor: Carl A. Waldspurger, Atherton, CA (US)

(73) Assignee: VMWare, Inc., Palo Alto, CA (US)

( * ) Notice: Subject to any disclaimer, the term of this patent is extended or adjusted under 35 U.S.C. 154(b) by 505 days.

(21) Appl. No.: 09/915,045

(22) Filed: Jul. 25, 2001

Related U.S. Application Data

(60) Provisional application No. 60/293,325, filed on May 22, 2001.

(51) Int. Cl.$^7$ .............................................. G06F 12/02
(52) U.S. Cl. ........................ 711/6; 711/216; 711/202; 711/203; 711/206; 718/1
(58) Field of Search ............................ 711/6, 216, 202, 711/203, 206; 718/1

(56) References Cited

U.S. PATENT DOCUMENTS

| | | | | |
|---|---|---|---|---|
| 5,757,919 A | * | 5/1998 | Herbert et al. | 713/187 |
| 6,075,938 A | * | 6/2000 | Bugnion et al. | 703/27 |
| 6,138,113 A | * | 10/2000 | Dean et al. | 707/2 |
| 6,233,668 B1 | * | 5/2001 | Harvey et al. | 711/206 |
| 6,349,355 B1 | * | 2/2002 | Draves et al. | 711/6 |
| 6,374,266 B1 | * | 4/2002 | Shnelvar | 707/204 |
| 6,496,847 B1 | * | 12/2002 | Bugnion et al. | 718/1 |
| 6,560,688 B1 | * | 5/2003 | Strongin et al. | 711/203 |
| 6,567,907 B1 | * | 5/2003 | Aglietti et al. | 711/206 |
| 6,581,142 B1 | * | 6/2003 | Jacobs | 711/159 |
| 2002/0099946 A1 | * | 7/2002 | Herbert et al. | 713/193 |
| 2002/0174315 A1 | * | 11/2002 | Yamamoto | 711/170 |

* cited by examiner

*Primary Examiner*—Mano Padmanabhan
*Assistant Examiner*—Jasmine Song
(74) *Attorney, Agent, or Firm*—Jeffrey Pearce

(57) ABSTRACT

A computer system has one or more software context that share use of a memory that is divided into units such as pages. In the preferred embodiment of the invention, the context are, or include, virtual machines running on a common hardware platform. The context, as opposed to merely the addresses or page numbers, of virtual memory pages that accessible to one or more contexts are examined. If two or more context pages are identical, then their memory mappings are changed to point to a single, shared copy of the page in the hardware memory, thereby freeing the memory space taken up by the redundant copies. The shared copy is ten preferable marked copy-on-write. Sharing is preferably dynamic, whereby the presence of redundant copies of pages is preferably determined by hashing page contents and performing full content comparisons only when two or more pages hash to the same key.

74 Claims, 5 Drawing Sheets

CONTENT-BASED, TRANSPARENT SHARING OF MEMORY UNITS

CROSS-REFERENCE TO RELATED APPLICATIONS

This application claims priority of U.S. Provisional Patent Application No. 60/293,325, filed May 22, 2001.

BACKGROUND OF THE INVENTION

1. Field of the Invention

This invention relates to the field of memory management in computer systems.

2. Description of the Related Art

Most modern computers include at least one form of data storage that has programmable address translation or mapping. In most computers, this storage will be provided by a relatively high-speed system memory, which is usually implemented using solid-state random-access memory (RAM) components.

Although system memory is usually fast, it does have its weaknesses. First, it is usually volatile. Second, for a given amount of data to be stored, system memory takes up more physical space within the computer, is more expensive, and requires more support in terms of cooling, component sockets, etc., than does a conventional non-volatile storage device such as a disk. Thus, whereas many gigabytes of disk storage are commonly included in even computers in the relatively unsophisticated consumer market, such computers seldom come with more than 128 or perhaps 256 megabytes of system RAM.

Because higher speed access to stored data and code usually translates into faster performance, it is generally preferable to run as much of an active application from system memory as possible. Indeed, many applications requiring real-time processing of complex calculations such as voice-recognition software, interactive graphics, etc., will not run properly at all unless a certain amount of RAM is reserved for their use while running.

High-speed system memory is a limited resource and, as with most limited resources, there is often competition for it. This has become an even greater problem in modern multi-tasked systems, in which several applications may be running or, at least resident in memory, at the same time. Even where there is enough memory in a given system for all the applications that need it, it is still often advantageous to conserve memory use: RAM costs money, and consumes both energy and physical space. More efficient management of RAM can reduce the cost, energy, or physical space required to support a given workload. Alternatively, more efficient management of RAM can allow a system to support a larger number of applications with good performance, given a fixed monetary, energy, or physical space budget.

Applications may be defined broadly as any body of code that is loaded and executes substantially as a unit. Applications include, among countless other examples, common consumer programs such as word processors, spreadsheets and games; communications software such as Internet browsers and e-mail programs; software that functions as an aide or interface with the OS itself, such as drivers; server-oriented software and systems such as a web server, a transactional database, and scientific simulations; and even entire software implementations of whole computers, commonly known as "virtual machines" (VMs).

One technique for reducing the amount of system memory required for a given workload, and thereby for effectively "expanding" the amount of available system M memory, is to implement a scheme whereby different applications share the memory space. Transparent page sharing, in the context of a multi-processor system on which virtual machines are running, is described in U.S. Pat. No. 6,075,938, Bugnion, et al., "Virtual Machine Monitors for Scalable Multiprocessors," issued 13 Jun. 2000 ("Bugnion '938"). The basic idea of this system is to save memory by eliminating redundant copies of memory pages, such as those that contain program code or file system buffer cache data. This is especially important for reducing memory overheads associated with running multiple copies of operating systems (e.g., multiple guest operating systems running as virtual machines—see below).

There are two main components to the technique disclosed in Bugnion '938. First, candidate pages that could potentially be shared are identified. Second, the pages are actually shared, when possible, so that redundant copies can be reclaimed.

The approach in Bugnion '938 for identifying pages is to add hooks to the system to observe copies when they are created. For example, a routine within the operating system running within the virtual machine—the virtual operating system VOS—that is used to explicitly copy memory regions is modified to allow copied pages to be shared. Note that the VOS may also be considered to be a "guest" operating system, since the virtual machine, although it is configured as a complete computer system, is actually a software construct that is running on an underlying, physical "host" system.

Another example is Bugnion '938's interposition on disk accesses, which allows disk transfers from a shared non-persistent disk to be shared across multiple guests (virtual machines). In this case, Bugnion '938 tracks disk blocks that are already in main memory, so subsequent requests for the same blocks can be shared. Similarly, support for special devices is added to guests, such as a special virtual subnet that supports large network packets, allowing guests to communicate with each other while avoiding replicated data when possible.

The Bugnion '938 approach for sharing a page is to employ an existing MMU ad (memory management unit) hardware device to map the shared page read-only for each guest that is sharing it, and to make private copies of the page on demand if a guest attempts to write to it. This technique is known as "copy-on-write" (COW), and is well-known in the literature. In the context of virtual machines, page-sharing can be made transparent to guest, that is, virtual, operating systems, so that they are unaware of the sharing. This is done by exploiting the extra level of indirection in the virtualized memory system between the virtualized guest "physical" memory (which the VM "believes" is the actual hardware memory, but which is actually a software construct) and the actual underlying hardware "machine" memory. In short, multiple guest physical pages can be mapped copy-on-write to the same machine page.

One disadvantage of the page-sharing approach described in Bugnion '938 is that the guest OS must be modified to include the necessary hooks. This limits the use of the Bugnion '938 solution not only to systems where such modifications are possible but also to those users who are willing and knowledgeable enough to perform or at least accept the modifications. Note that such attempted modifications to commodity operating systems may not be possible for those other than the manufacturer of the operating system itself, and then not without greatly increasing the probability that the modifications will lead to "bugs" or instability elsewhere.

Another disadvantage of the Bugnion '938 system is that it will often fail to identify pages that can be shared by different VMs. For example, assume that each VM is using its own persistent virtual disk, that each VM is running a different operating system as the guest OS, for example Windows NT4 and Windows 2000, respectively, and that each is running completely different installations of the software package Microsoft Office 2000. The executable code (for Office 2000) will then be identical for the two VMs, yet the Bugnion '938 system will not identify this. Two complete copies of the same program may then be resident in the system memory at the same time, needlessly taking up many megabytes of memory in order to store the redundant second copy of the program code.

What is needed is a memory management system (and corresponding method of operation) that can be implemented without having to add hooks to the existing guest operating system, and that is able to identify opportunities for page .sharing that are not found and exploited by existing memory management techniques. The memory management system should, however, remain transparent to the applications that are using it. This invention provides such a memory management system and related method of operation.

SUMMARY OF THE INVENTION

The invention provides a method and a related system configuration for sharing memory units, such as pages, in a computer system that includes a hardware memory and at least one context. Each context has a virtual memory that is divided into a plurality of virtual memory units that are mappable to corresponding hardware memory units. The memory may be persistent or non-persistent. According to the invention, the system identifies virtual memory units that have identical contents and then maps those virtual memory units identified as having identical contents to a single instance of a corresponding one of the hardware memory units.

In the preferred embodiment of the invention, candidate memory units are selected from among the virtual memory units and their contents are hashed.

Identification of virtual memory units that have identical contents is preferably carried out by calculating a hash value by applying a hash function to the contents of a current one of the candidate memory units. A data structure such as a hash table is then searched to determine the presence of a previous data structure entry corresponding to the calculated hash value. If a previous entry is not present in the data structure, then a new entry is inserted into the data structure corresponding to the current candidate memory unit. If a previous entry is present in the data structure, then the entire contents of the current candidate memory unit are compared with the contents of the single instance indicated by the previous entry.

According to one aspect of the preferred embodiment of the invention, all or only selected ones of the virtual memory units that are mapped to the single instance are write-protected, such as by using a copy-on-write (COW) mechanism. A request by any context to write to any write-protected virtual memory unit is then sensed. Upon sensing such a request, a private copy of the write-protected virtual memory unit is generated in the hardware memory for the requesting context and the write-protected virtual memory unit is remapped to the private copy.

In order to improve the efficiency of the invention even further, any or all of several optimizations may be implemented. One such optimization involves identifying virtual memory units that have a relatively high probability of impending modification and then designating these as temporarily non-sharable virtual memory units. For these temporarily non-sharable virtual memory units, mapping to the single shared instance is then preferably deferred, for example, until a different one of the virtual memory units is subsequently identified as having contents identical to the respective temporarily non-sharable virtual memory unit. As yet another optimization, write-protection is deferred for any candidate virtual memory unit for which no other virtual memory unit has yet been identified as having identical contents.

The invention provides different ways to select candidate virtual memory units for content-based comparison with other virtual memory units and for possible sharing. For example, selection may be random, or according to any of several heuristic criteria. Candidate virtual memory units are preferably selected and examined for possible sharing during a system idle time.

The preferred embodiment of the invention is virtualized, in which the computer Ad system includes at least one virtual machine, which forms a context and has at least one address space that is divided into a plurality of virtual memory units. The virtual machine also includes a virtual operating system that maps each virtual memory unit to a corresponding intermediate memory unit. In this embodiment, for each virtual machine, the system also includes a software layer—a virtual machine monitor—as an interface between the virtual machine and the underlying system software and hardware. Among other things, the virtual machine monitor implements an intermediate mapping of each intermediate memory unit to a corresponding hardware memory unit. In this virtualized embodiment, the intermediate memory units, instead of the virtual memory units, are chosen and mapped to the shared instances of hardware memory. Other procedural steps such as content-based comparison, write-protection, etc., are then also carried out based on the intermediate memory units. The intermediate mapping provides an extra level of indirection that is advantageously exploited by the virtualized embodiment of the invention.

In one alternative embodiment of the invention, at least one context is a virtual disk.

In another "brute force" embodiment of the invention, hashing is not used at all. Rather, in order to discover virtual memory units that are identical to others, the system simply compares the contents of each of the virtual memory units with the contents of each of the other virtual memory units.

According to yet another aspect of the invention, the virtual memory units are partitioned into a plurality of classes. The steps of identifying virtual memory units that have identical contents and of mapping those virtual memory units to a single shared instance of a corresponding hardware memory unit are in this case carried out separately and independently for each of the classes. Sharing of single instances of the hardware memory units thereby takes place only among virtual memory units in the same class. One example of possible classes are page colors of the hardware memory units to which the corresponding virtual memory units are currently mapped. Another example is the case in which the computer system has a multiprocessor architecture with a non-uniform memory access (NUMA) property and a plurality of memory modules having different access latency. In this case, the classes are the memory modules to which the corresponding virtual memory units are currently mapped.

DETAILED DESCRIPTION

Figure 1:
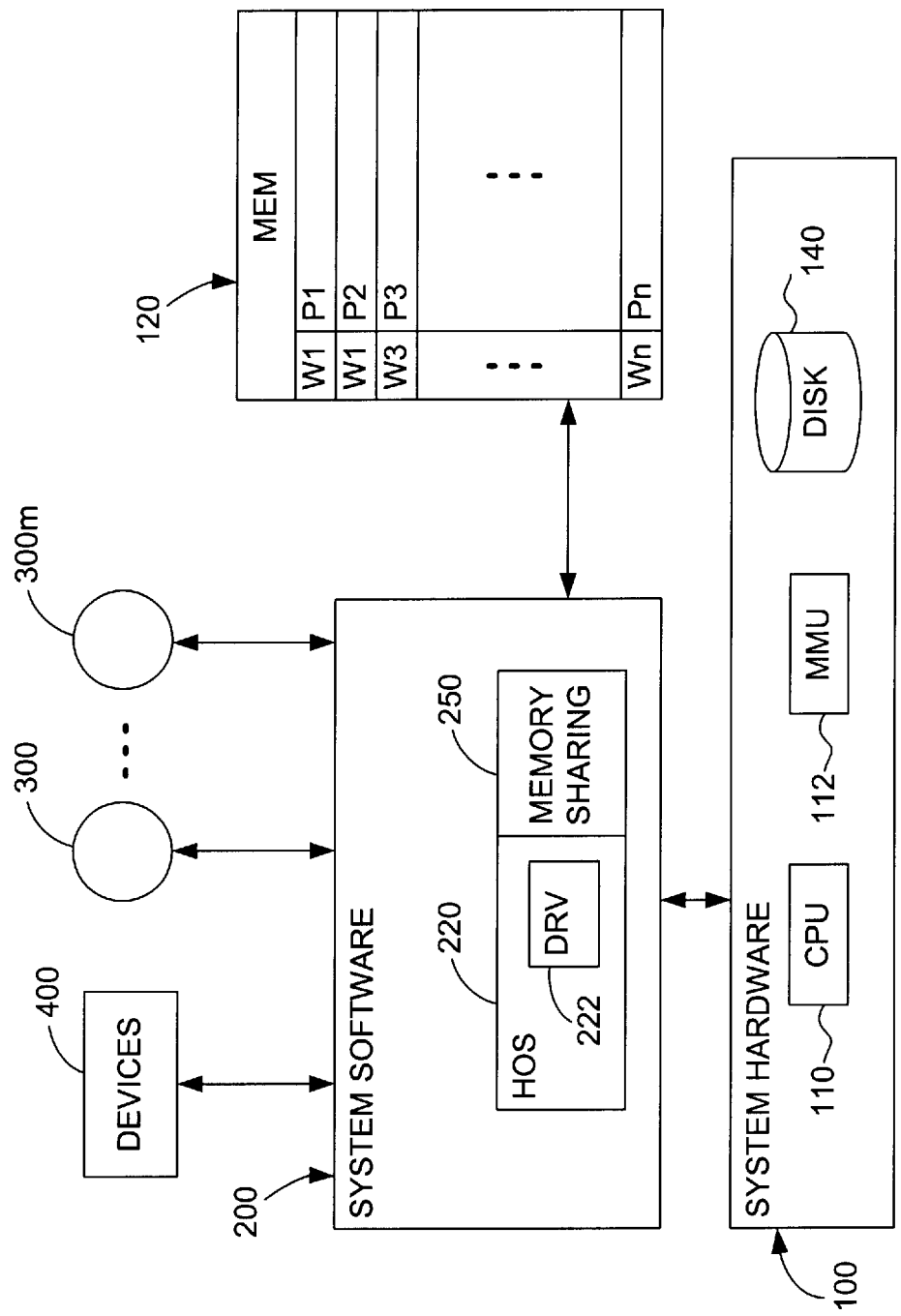
FIG. 1 is a block diagram that illustrates the main hardware and software components of the invention.

The main idea implemented by the invention is content-based identification of units of a data storage space that different contexts may be able to share. This brief encapsulation of the main idea uses terms that bear definition, namely, "content-based identification," "units of a data storage space," "contexts," and "sharing." Much of the rest of this description relates to the concepts of content-based identification and sharing as used in the invention.

The invention may be used to more efficiently manage all types of data storage, both volatile (non-persistent) and non-volatile (persistent), as long as the addresses to data stored on the storage medium or in the storage components can be programmably translated or mapped. The invention will be most useful, at least given the technology now most commonly in use, where the data storage is system RAM memory; this is therefore assumed in the description below by way of example. Embodiments of the invention relating to transparent, content-based sharing of units of storage on persistent media are, however, mentioned below. Any changes to adapt the invention to other data storage technologies will be obvious to skilled computer programmers.

As is well known, the system memory is typically divided into individually addressable units or units, commonly known as "pages," each of which in turn contains many separately addressable data words, which in turn will usually comprise several bytes. Pages are identified by addresses commonly referred to as "page numbers." The invention does not presuppose any particular page size: Any memory unit may be used and will require little or no modification of the preferred embodiment of the invention described below. All that is required is that the memory unit be uniquely identifiable, that it can be write protected in some way, that its contents (for example, the bits, or bytes, or words) can be compared with those of other memory units, and that addresses can be programmably translated, that is, mapped, for example, using the support typically provided by the memory management unit hardware in modern processors.

The write-protection feature of memory that the invention uses is the ability to mark one or more pages, either individually or as a group, in such a way that any attempt to write to those pages will be detected and can be prevented or at least temporarily delayed. This is commonly known as "write protection." In some systems, individual pages may be marked write-protected, for example using the usual memory management unit (MMU) and page table mechanism. In addition, or instead, other systems include a feature, such as the Memory Type Range Register (MTRR) feature of the Intel IA32 architecture, that allows a limited number of contiguous regions to be write-protected; in such systems, instead of write-protecting an individual page, attempted writes to any pages in any marked region will then be detectable. All that is required in this invention is that any memory unit to be shared can be marked in some way (including being copied into a larger, marked region), using any mechanism, such that attempted writes can be detected. Merely by way of example, it is assumed below that pages can be individually write-protected.

The term "context" is used here to refer to any software or hardware component, device or system, that addresses and reads from the hardware memory and that has its own address translation (mapping) state. For a traditional OS, a "context" would typically be a "process," which has an address space and associated page tables that contain information about how to map virtual pages to physical pages (see below), and also page-level protection information, such as "read-only" for COW pages. In the preferred embodiment of the invention described below, the context is a virtual machine.

It is not necessary according to the invention that sharing occurs between contexts; rather, page sharing may even be within a single context. One example of this would be where the context is a single virtual machine on which different application programs are running and are using the same virtualized physical memory.

The system according to the invention needs to determine whether units of memory (such as pages) have identical contents and can potentially share a single instance of the unit. Unlike other memory sharing routines found in the prior art, the method implemented by the system according to the invention does not require any information about when, where, or how page contents were generated, although some of this information is used in refinements to the fundamental embodiment of the invention in order to improve different aspects of performance.

This content-based approach according to the invention is general-purpose, and has important advantages over the more restrictive Bugnion '938 approach. First, the content-based approach according to the invention can identify more opportunities for sharing; by definition, all potentially sharable pages can be identified by their contents. Second, in one embodiment of the invention that is used for memory management of virtual machines, the invention eliminates the need to modify, hook, or even understand guest OS code, which may be difficult or even impossible in many commercial environments (e.g., no access to proprietary Microsoft OS source code).

The features of the sharing system and method according to the invention are described in greater detail below. Before this, though, the main hardware and software components of the invention are described.

Main System Components

As FIG. 1 shows, the main components of the system according to the invention include an underlying hardware platform 100, host system software 200, and a plurality of software contexts 300, . . . , 300m that run on the host system software 200 (which may constitute a context of its own). As in most computers, two different types of data storage are typically provided: a relative fast system memory 120 (the hardware machine memory), typically implemented using any of the various RAM technologies, and usually a non-volatile, often higher-capacity storage device 140 such as one or more memory disks. Note that some systems do not include any disk at all, such as handheld computers that employ flash memory devices instead disks. FIG. 1 also shows that conventional peripheral devices 400 may be connected to run on the hardware 100 via the host system software 200; no particular peripheral devices are required by the invention.

As will become clearer from the description below, this invention does not require any particular hardware platform. Nonetheless, because it is so common, and by way of example only, it is assumed below that the hardware platform 100 has an x86 architecture (used in the Intel IA32 line of microprocessors). As in any x86 system, it is therefore further assumed that memory is divided into, addressed, and write-protected by pages, although, as is mentioned above, the invention may operate with other schemes as well, such as using Intel's MTRR feature for several pages at once.

The system hardware 100 includes a central processor (CPU) 110, which may be a single processor, or two or more cooperating processors in a known multiprocessor arrangement. As in other known systems, the hardware includes, or is connected to, conventional registers, interrupt-handling circuitry, and a memory management unit MMU 112. The MMU is usually integrated on-chip in modern CPUs and uses page table information that is established by the system software. In the, figures, the memory 120 is shown being external to the hardware platform 100 merely for convenience of description; in actual systems, the memory is of course also part of the computer's hardware.

As in other computer systems, the system software 200 according to the to invention includes a host operating system HOS 220, which will include drivers 222 as needed for controlling and communicating with the various devices 400 and, usually, for the disk 140 as well. Because this invention does not presuppose any particular host operating system, and because the characteristics and functions of operating systems are so well known, the HOS 220 is not discussed in greater detail, except insofar as it cooperates with the components of the system unique to the invention.

One of these unique components is a software module referred to as a memory or page-sharing module 250, which is described separately below. In one embodiment of the invention, the memory-sharing module 250 is implemented, using known techniques, as a part of the memory-management routines found within the existing host operating system. In a preferred, virtualized embodiment of the invention, however, the module 250 is implemented within a separate software mechanism used to control virtual machines (VMs). These embodiments and aspects of the invention are described in more detail below.

Memory Reads And Writes

Although it is not required by this invention, reads and writes of memory pages are typically carried out directly by the CPU 110, in particular, by the MMU 112. Note that there is also usually a hardware cache of this page table information (page tables are typically stored in ordinary RAM); which is commonly referred to as a "translation lookaside buffer" (TLB). None of this is x86-specific.

The CPU usually handles reads and writes at a finer granularity than pages; for example, it accesses individual 32-bit words or even individual bytes. Translation, that is, mapping of memory addresses and protection checks (such as read-only) are usually done, however at the granularity of pages. In the common case, this is all done in hardware in order to increase speed, with faults in exceptional cases such as a TLB miss, which may be handled in either hardware or software, depending on the processor architecture.

Comparison of Memory Pages

In the invention, it is assumed that the memory is, for purposes of addressing, divided into separately addressable groups of memory units. The most common id memory group is a "page," and this term is used here without loss of generality. In the widely used Intel x86 architecture, a memory page comprises 4 KB, that is, is 1024 thirty-two-bit data words, or 4096 eight-bit bytes. The techniques described below may be easily adapted to any page or word size, however, by any skilled programmer.

The idea behind the invention is that the demand on the system memory can be reduced by allowing one or more contexts to share a single copy of a page when possible, but to create private copies of the page when necessary. Sharing may take place either intra-context or inter-context, or both. In particular, there is no need to maintain two or more identical pages in memory unless a context needs a private copy in order to be able to change it. The invention must therefore in some way determine when two pages are identical.

One way to determine whether any two (or more) pages of memory are identical would be simply to go through the entire memory at predetermined times and compare the contents of every possible page pair, remove all redundant copies, and change all mappings to point to a single remaining copy. In essence, in such a naive or "brute force" process, each set of duplicate pages containing identical data would be collapsed into a single instance of the page. Such an exhaustive, straightforward procedure, however, would clearly be prohibitively expensive in terms of required processing time: Such naive matching would require a number of comparisons that grows quadratically with the number of pages.

According to the invention, hashing is instead preferably used to efficiently and dynamically identify pages with identical contents and thus to reduce the effort involved in identifying copies. Using an appropriate hash function, the number of comparisons required to find all duplicates grows approximately linearly, rather than quadratically, with the number of pages.

Translation (Memory Mapping) and Address Terminology

The most straightforward way for all contexts to uniquely identify a memory page would simply be for them all to use a common set of page numbers. This is almost never done, however, for many well-known reasons. Instead, contexts normally refer to memory pages using one set of identifiers, which is then ultimately mapped to the set actually used by the underlying hardware memory.

When a context requests access to the memory, the request is issued usually with a "virtual address," since the memory space that the context addresses is a construct adopted to allow for much greater generality and flexibility. The request must, however, ultimately be mapped to an address that is issued to the actual hardware memory. This mapping, or translation, is typically specified by the operating system. The operating system thus converts the virtual page number (VPN) of the request into a "physical" page number (PPN) that can be applied directly to the hardware.

For example, when writing a given word to a virtual address in memory, the processor breaks the virtual address into a page number (higher-order address bits) plus an offset into that page (lower-order address bits). The virtual page number (VPN) is then translated using mappings established by the operating system into a physical page number (PPN) based on the page table entry (PTE) for that VPN in the page table associated with the currently active address space. The actual translation may be accomplished simply by replacing the VPN (the higher order bits of the virtual address) with their PPN mapping, leaving the lower order offset bits the same. Normally this mapping is obtained quickly by looking it up in the hardware TLB. (If not, a "TLB miss" occurs, and the page tables in memory are consulted to update the TLB before proceeding.) The TLB entry also contains various flags or permission bits, such as "read-only" or "read-write."

Trying to write to a read-only page will cause a fault, which involves a jump to a predefined software page fault handler; this is what happens, for example, during a COW fault. If the page is "read/write" and other conventional checks succeed, then the write is allowed to proceed, and the physical address is constructed as the PPN (higher-order physical address bits) concatenated with the lower-order address offset bits. The write is then issued using the physical address.

In the preferred embodiment of the invention, the contexts sharing the memory are virtual machines (VMs). This embodiment is discussed in greater detail below, with reference to FIG. 5. For the sake of clarity and consistency of terminology, however, the additional level of indirection in memory management that virtualization introduces is discussed at this point: Applications running in a VM issue memory requests using virtual addresses (VPNs) exactly as in non-virtualized systems and a corresponding virtual operating system (VOS) translates these into physical addresses (PPNs). Although the VM "believes" the PPNs thus obtained will be used to address the hardware memory, in fact they are not. Each PPN passed from the VOS is thus a virtualized physical page number, since it in fact refers to an address in a memory space of a virtualized memory 312 (see FIG. 5 and the related description below). An underlying software layer (such as a virtual machine monitor) then remaps the VOS-created PPN into the actual hardware, machine memory page number MPN, which may be done using the same structures and techniques that are used for memory mapping in non-virtualized systems.

The concepts "context," virtual page number VPN, physical page number PPN, and machine page number MPN are therefore analogous, but slightly different in virtualized and non-virtualized (that is, "traditional") system configurations. In this description, these terms are used as follows:

Non-Virtualized Configuration:
  Context: A process with its own address space.
  VPN: A virtual page number associated with a process.
  PPN: A physical page number that refers to the actual hardware memory. The operating system specifies mappings from VPNs to PPNs, and the hardware MMU then performs the actual translation of VPNs to PPNs using these mappings.
  MPN: A machine page number, identical to PPN.
Virtualized Configuration:
  Context: A virtual machine with its own virtualized physical memory.
  VPN: A virtual page number associated with a process running in a guest OS within a VM, that is, in the virtual operating system VOS. Each process in the VM Lab has its own virtual address space.
  PPN: A physical page number that refers to a virtualized physical memory space associated with the VM. As is mentioned above, the VM operates as though this PPN refers to actual hardware memory, although it is actually a software construct maintained by the VM software layer. The guest OS (VOS) specifies mappings from VPNs to PPNs.
  MPN: A machine page number that refers to actual hardware memory. The VM software layer (for example, a virtual machine monitor VMM) specifies mappings from each VM's PPNs to MPNs. This adds an extra level of indirection, with two address translations (mappings) instead of one: a VPN is translated to a PPN using the guest OS mappings, and then this PPN is mapped to an MPN by the VM software layer. The VMM preferably maintains its own separate page tables from VPNs to MPNs, so the hardware MMU is able to translate VPNs directly to MPNs.

The main difference between the virtualized and non-virtualized configurations is the point at which the address translation is modified to share pages. This determines the level of "transparency" when pages are shared. In the virtualized case, the PPN-to-MPN translation is modified to implement sharing, thereby making the sharing transparent to the virtual machines and their guest operating systems. In the non-virtualized embodiment, the VPN-to-MPN translation is modified to implement sharing, thereby making the sharing transparent to processes, but requiring changes to the OS that specifies the mapping.

The preferred virtualized embodiment thus has the significant advantage of not requiring any modifications to existing operating system code. This means in turn that this embodiment of the invention is completely independent of the guest operating system(s). This also means that the invention may be used where the source code of the guest OS is not even accessible or for some other reason cannot be modified.

In the following description, except where otherwise indicated, the term "context page number" CPN is used to indicate the page number ultimately used in the final mapping to MPNs. Thus, in the non-virtualized configuration, CPN=VPN; in the virtualized configuration, CPN=PPN, since the VPN generated by the VM context goes through the intermediate VPN-to-PPN mapping.

Remapping

Assume now that first and second context page numbers CPN1 and CPN2 map to corresponding MPNs MPN1 and MPN2, respectively. Note that these two context pages may be associated with different contexts (C1≠C2) or with the same context (C1=C2). Thus:
  Map(CPN1)=MPNI and Map(CPN2)=MPN2 Now if the mapping of CPN2 is changed to MPN1, both CPN1 and CPN2 will be translated to the same machine page MPN1. Thus:
  Map(CPN1)=MPN1 and Map(CPN2)=MPNL
As long as the contexts C1 and C2 will only ever try to read the pages CPN1 and CPN2, then MPN2 could be freed for other uses and neither context would ever be aware that the redundancy was eliminated.

Such sharing of pages can often lead to large savings. One type of savings is that the likelihood of contention for memory is reduced: In effect, through page sharing, more memory becomes freed for other use. Another type of savings is that sharing may allow the use of a smaller memory, that is, fewer or smaller "chips;" this in turn saves not only cost but also energy, design complexity, and physical space on circuit boards. Such savings are often highly desirable, such as in small, mobile systems; indeed, in some cases, such savings may be necessary for a desired architecture to operate at all. For example, it would normally be impossible to keep resident two separate 128 MB VMs, each running the same guest OS, on a computer that has only 192 MB of system memory. By sharing a single copy of the guest OS, both VMs could be accommodated.

Procedural Outline

Figure 2:
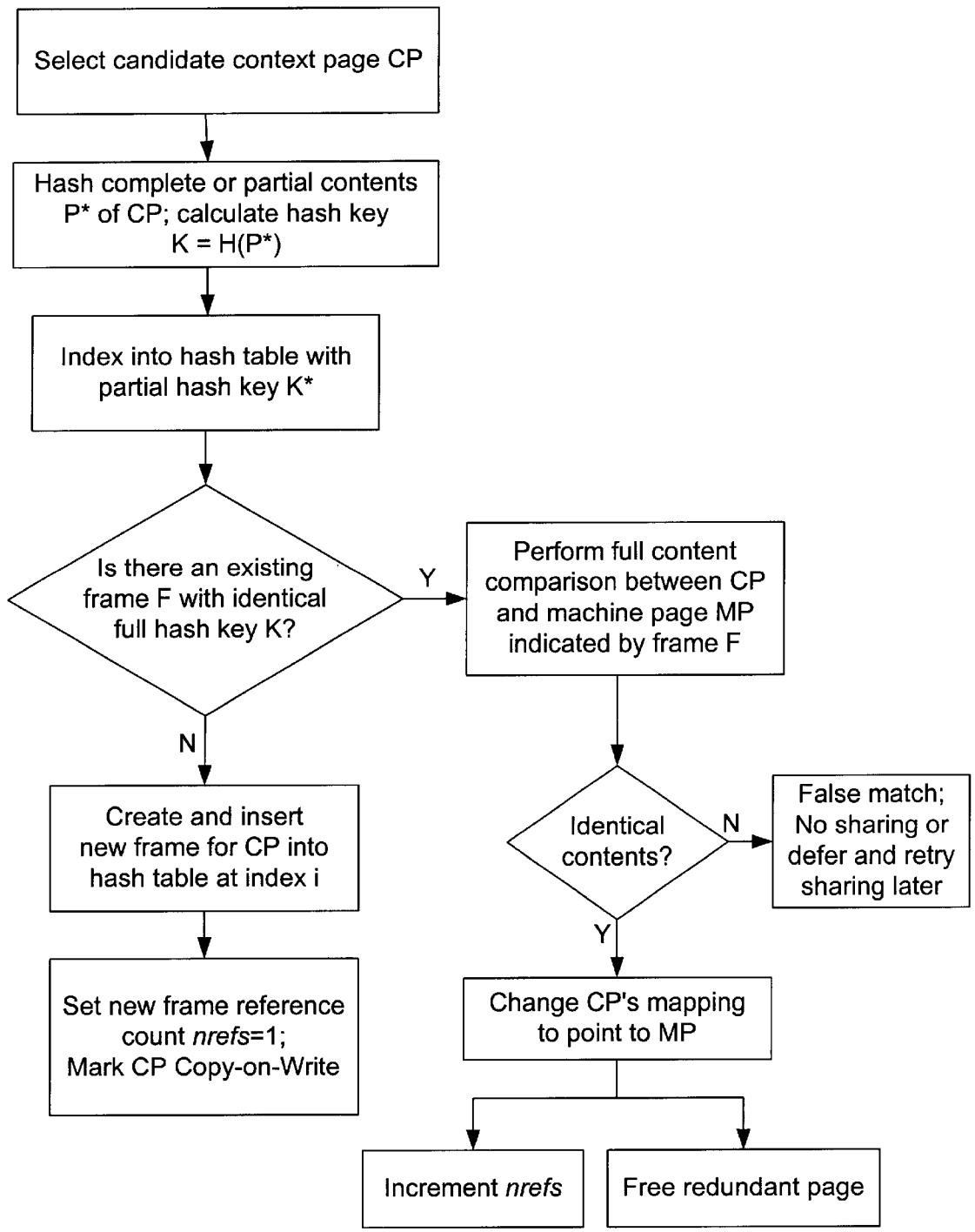
FIG. 2 is a block diagram that illustrates the main steps performed by a memory sharing module implemented according to the invention.
Figure 3:
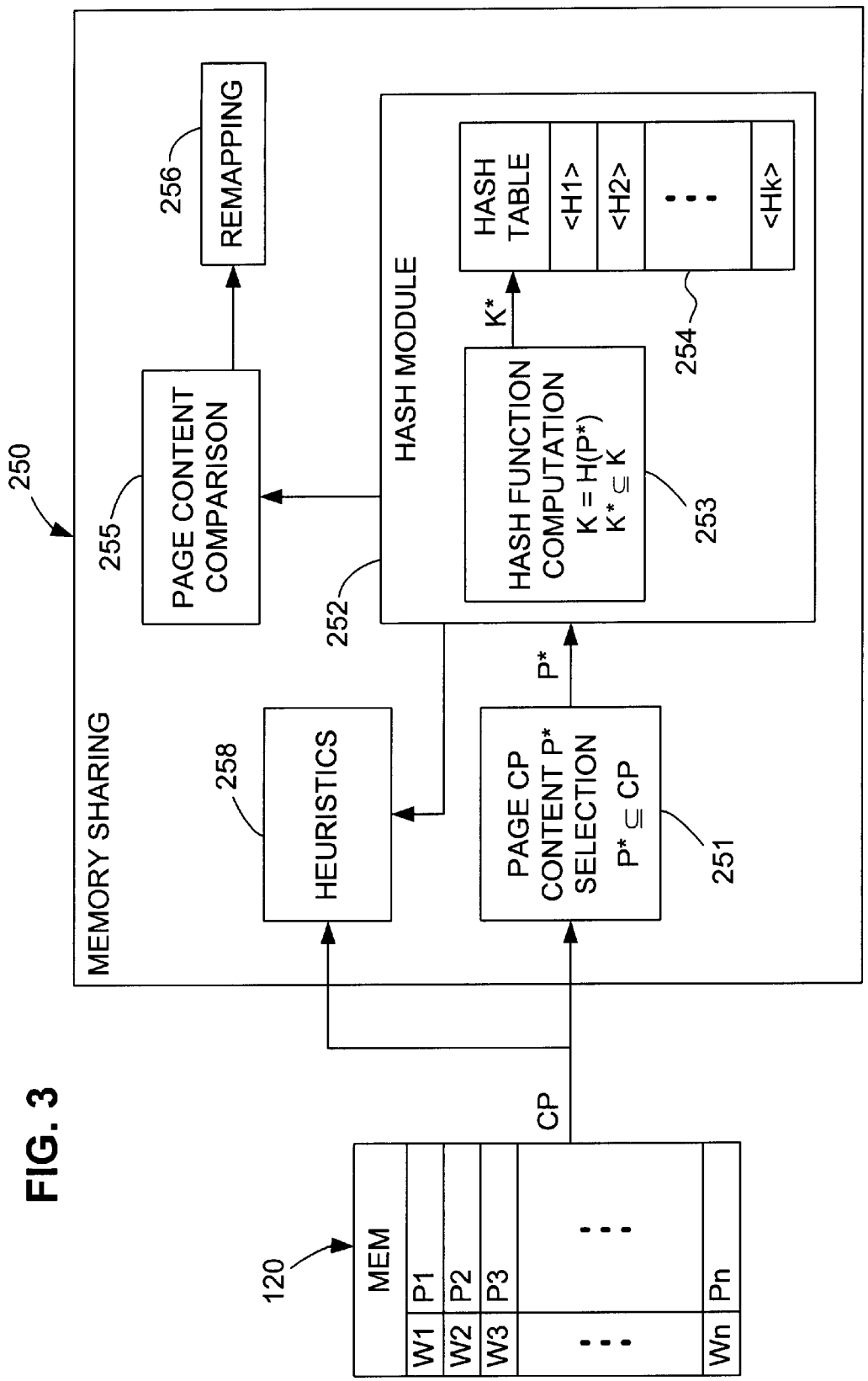
FIG. 3 shows the main sub-modules of a memory sharing module according to the invention.

FIG. 2 is a flowchart that outlines the main procedural steps of a basic embodiment of the invention. Most of these steps are implemented in the page sharing module 250 and are described in greater detail below, but are discussed generally here in order to provide an overview of the particulars of the invention. Certain modifications and refinements of the illustrated basic embodiment are also explained below. FIG. 3 illustrates the page structure of the memory 120, as well as the corresponding main components of the memory sharing module 250 according to the invention.

As FIG. 3 shows, the memory 120 includes pages P1, P2, . . . , Pn that are allocated to various contexts; the memory will usually also comprise many other pages and memory regions that are reserved for use by modules other than contexts and thus lie outside of any context's address space. In FIGS. 1 and 3, the pages P1, P2, . . . , Pn are illustrated adjacent to each other, that is contiguous. This will be the most common case in conventional computer systems, but it is not required by the invention.

HE The invention does not require any particular arrangement or distribution of pages.

One structure stored in memory is a data structure storing copy-on-write (COW) indicators (W1, W2, W3, . . . , Wn), which may be arranged in any known manner.

For example, these COW indicators are preferably implemented for use with the existing write-protect fault mechanism of the hardware MMU. Particular pages are marked read-only in order to trigger the software to create copies of the COW-marked pages upon any attempt to write to them. Of course, the system software and the contexts themselves will typically also reside in memory and will occupy memory pages. In FIGS. 1 and 3, the COW indicators W1, W2, W3, . . . , Wn are shown as being "aligned" with their respective memory pages P1, P2, . . . , Pn. This is done for the sake of ease of illustration only. In actual implementations, as long as the COW indicators are properly associated with respective pages, then any known data structure may be used to contain the COW indicators and may be stored anywhere in memory.

As a first step, a candidate selection sub-module 251 within the module 250 selects a context page CP as a candidate for possible sharing. All or some subset P* of the contents of CP are then used as the argument to a hash function H implemented in a hash module 252, in particular, in a hash computation sub-module 253, which calculates a hash key $K=H(P^*)$.

No special hash function is required by the invention, although one with good statistical properties is preferred, for example, a hash function that maps page contents to table entries with an equal probability distribution. Hashing algorithms are well known in the literature, and hash values are sometimes referred to alternatively as fingerprints, message digests, or checksums. In one prototype of the invention, for example, the hash function was the widely used, public-domain "Bob Jenkins" 64-bit hash function.

Note that a hash value does not necessarily imply the use of a hash table: As used here and in the art of computer programming in general, a hash function is simply a function that takes a larger body of data as an argument and outputs a representation (usually, a single number) of the data in a reduced form. In other words, a hash set function is a mathematical function that maps a relatively large domain (here, the complete or partial contents of a page) onto a relatively smaller range (here, the hash value or "key"), usually with the goal of producing an even distribution on the smaller range.

In the preferred embodiment of the invention, the hash key is then used as a look-up value to index into a hash table 254, which is itself stored in memory, and whose entries are preferably initially set to some null or initial value. In the preferred embodiment of the invention, only a portion K* of the full hash key is used to index into the hash table. In one prototype of the invention, for example, each full hash key K was 64 bits longs and K* consisted of its 18 low-order bits, which were used to index into the hash table, which had $2^{18}$ entries. Of course, the size of the hash table 254, the size of the hash keys K, and how (for example, what portion of) the hash key is used to index into the table are design options that a skilled programmer will be able to choose given the requirements of any particular implementation of the invention.

The system then determines whether any previous virtual page hashed to the same hash table index. In the preferred embodiment of the invention, this is done by traversing a list of "frame" structures, as explained below.

If the hash table has no non-null entry/entries at the same table index, then the corresponding entry of the hash table is updated to reflect that the current candidate page hashed to this entry. The existing CPN-to-MPN mapping of the candidate page continues to be used as usual. In the basic embodiment of the invention, that CPN is also marked COW at this time (an alternative is described below).

Assume, however, that at least one other virtual page previously hashed to the same table entry. In the preferred embodiment of the invention, the full keys of the current candidate page and the earlier page are then compared. Assume that the earlier page was mapped to MPN1, and that the current mapping of the current candidate page is to MPN2. If the full keys of the candidate and previous pages are identical, then the entire contents of the current candidate page (located at MPN2) are compared with the contents of the machine memory page MPNI by a comparison module 255. By way of example of the efficiency of the invention, note that only 4096 byte-by-byte comparisons, or 1024 comparisons of 32-bit words, will at most be needed for a standard (Intel x86) memory page. Note that a failure to match may be detected before the entire page contents are compared, at which point further comparison will be unnecessary. If the contents are not the same even though the full hash keys are identical, then the system preferably simply views this relatively rare situation as a "false match" and does not proceed with any remapping of the candidate page.

If, however, the contents are the same, then this means that the contents of MPN2 are identical to the contents of MPN1. A single instance of this page may therefore be shared, and the sharing Will be completely transparent to any context(s) that may ever need to read the current candidate page or any previous page(s) that share the single instance, MPN1. Note that any number of candidate pages may be thus "collapsed" into the single instance found at MPN1. (Indeed, there will often be hundreds if not thousands of "empty" pages, that is, pages containing only zeroes, all of which could just as well be mapped to a single instance of an empty page of actual hardware memory.) The mapping of the current candidate page is then changed, for example by a remapping module 256 that cooperates with the hardware MMU, from MPN2 to MPN1, whereupon MPN2 itself may be freed for other use. In the preferred embodiment of the invention, a reference counter is then also incremented to indicate that one more page now maps to the single instance MPN1.

Hash Key Aliasing

In a prototype of the preferred embodiment of the invention, the public domain, 64-bit "Bob Jenkins" hash function is used. This makes it extremely unlikely that two pages with different contents will hash to the same 64-bit value. Theoretically, the number of pages needed before one would expect to see a single false match is approximately sqrt(2^64), or 4G pages. On the largest currently-available Intel x86 systems, a machine may have at most 64GB physical memory, or 16M pages. The odds against encountering even a single false match across all pages in memory are therefore more than 100:1. As is mentioned above, the actual page contents are preferably compared after a hash key match to identify a true copy. False key matches are, however, rare enough (on the order of one in a billion) that such pages can simply be considered "unshareable" with the result that no remapping is carried out for the current candidate page.

Sharing Using Copy-On-Wrote(COW)

If one context were to change the contents of a shared copy of a page, typically by writing to the page, then this would affect other contexts (or other aspects of a single context) sharing that page. In order to avoid the possibly large errors this data corruption might cause, once a complete content-based page match has been found, a COW technique based on read-only mappings, like the approach used by Bugnion '938, is preferably employed to actually share the page(s), whereupon each redundant copy can be reclaimed. Any subsequent attempt to write to the shared page will then generate a copy-on-write fault, which will in turn transparently result in the creation of a private copy of the page for the writing context.

The COW technique may also be used even in cases where no match is found for the newly hashed candidate page. In this case, in addition to being inserted into the hash table, the corresponding page may also be marked COW in anticipation of future matches with later page lookups. Alternatively, the system can simply refrain from sharing that particular page at the current time. More sophisticated approaches may also be used, for example, if information is available about the expected probability of a future match.

Preferred Hash Table Structure

Figure 4:
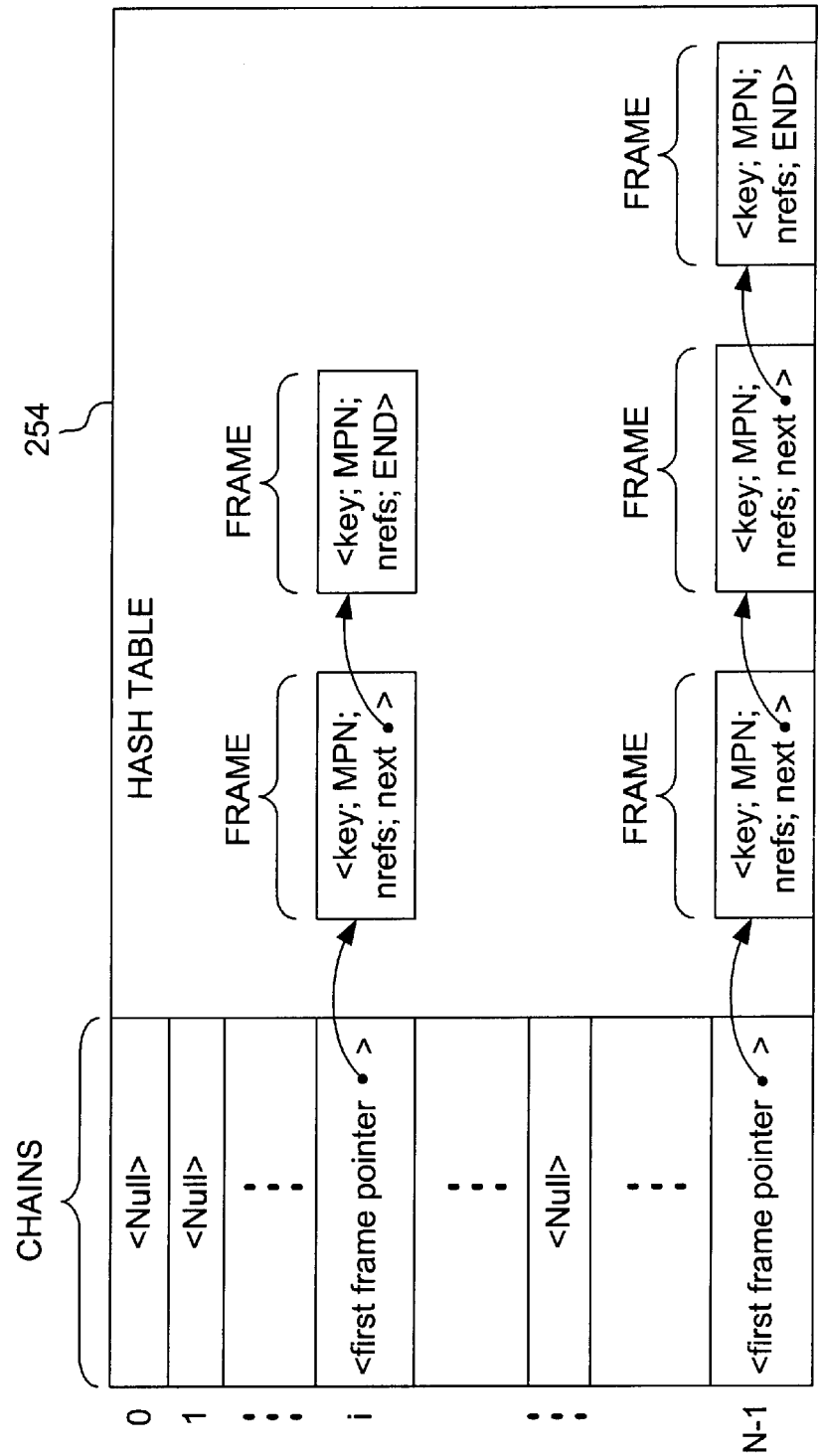
FIG. 4 illustrates a preferred structure for a hash table used in the invention.

FIG. 4 illustrates the hash table 254 structure that was used successfully in a prototype of the invention. Two main data structures are preferably included: a table of "chains" and linked lists (possibly empty) of "frames". Storage for each structure is preferably pre-allocated during system initialization as contiguous machine pages.

The table of chains functions as the "entry" point for the hash table as a whole, in that the index (shown as running from 0 to N−1) identifying each chain is the entry index of the table. The range of the chain table index covers the range of possible partial hash keys K*. As FIG. 4 illustrates, each element of the chain table contains Ad either an initial, null value, or a pointer to a first frame that corresponds to a page that sf=hashed to the chain's index value.

Each frame is a data structure preferably containing at least the following values:

1) The full hash key of the page that hashed to the index value. Recall that only a portion (for example, the 18 low-order bits of a full 64-bit key) of the full key is preferably used to index into the hash table, so that different full hash values may lead to the same chain;

2) The MPN of the shared or sharable page that generated the full hash key. This will usually be the MPN mapping of the first context page at CPN with the given full hash key, although this is not certain in all cases or required by the invention. Note that this page MPN may be shared by any number of contexts.

3) A reference counter nrefs that indicates the level of sharing, that is, the number of distinct context pages currently sharing the page, or, in other words, how many CPNs are currently mapped to a single shared instance (MPN) of a page. One of the advantages of the nrefs counter is that it eliminates the need to maintain a back-map from the shared page in order to identify all the contexts and pages that are sharing the page—all that is needed is for the system to know whether at least one page has previously hashed to the particular entry, and the nrefs counter will indicate this. Moreover, a single counter may be kept compact (a single integer), with a constant size, regardless of the level of sharing, whereas a backmap grows linearly in size with the number of sharers.

It is also possible that the system may need to decrement the reference counter. Assume, for example, that a context wishes to write to CPNx, which is currently mapped to a single, shared copy of an MPN. As is mentioned above, CPNx will be marked COW. Thus, a write will generate a COW fault and the COW fault handler will remap CPNx to MPNx instead of to MPN. One fewer page, namely, CPNx, will then be sharing MPN, so that the counter nrefs must be decremented. If nrefs decrements to one, then the corresponding frame can be removed from the hash table entirely, since the corresponding MPN is effectively private. To remove a frame, the pointer of the preceding frame can be changed to point to the frame after the frame to be removed and the frame itself can be deallocated. Alternatively, the frame may be left in the table in anticipation of potential future key matching and page sharing. If a COW fault happens when nrefs=1, then the system may similarly remove the frame from the table and return its MPN without copying it, since it is the last reference.

4) Either a pointer to the next frame of the same chain, or an END value indicating there are no more frames for the respective chain.

Frames are thus preferably arranged as linked lists, which the chain pointing to the first frame in the list. In one prototype of the invention, each element in the chains table was encoded using three bytes, that is, 24 bits. Sixteen bytes (128 bits) were used for each frame, with 64 bits being used for the full hash key, 24 bits for the shared MPN page number, 16 bits for the reference counter, and 24 bits for the "next frame" pointer in order to maintain a singly linked frames list.

In any given implementation of the preferred embodiment of the invention, the table of chains (also known as "buckets") and the table of frames will be sized based on the total number of MPNs in the system. Preferably, the table is sized to accommodate the worst case, in which no pages are shared, in which case there will be one frame per MPN, and with the chains table preferably the next higher power of two in order to simplify indexing. In the prototype, the overhead per MPN was therefore approximately 19 bytes (three for the chain pointer and 16 for the frame data). Given a page size of 4K, the overhead was therefore only 19/4096, or roughly 0.5%.

With a 16-bit reference counter, overflows will be very rare indeed: A 16-bit counter can represent up to 64K pages, each of which is 4K bytes in size, for a total of 256 MB of memory. In order to overflow, fully 256 MB of pages would have to contain identical contents. Nonetheless, in order to avoid even potential problems with overflow, the system according to the invention may include, or, upon sensed nrefs overflow, generate, a separate "overflow" table that is used to store extended frames with larger counts. If the maximum 16-bit value of nrefs is reached, the system may then consult the overflow table to obtain/update a reference count using a larger (for example, 32-bit) overflow counter. The overflow frame in the overflow table could then pa also be deleted when nrefs once again drops to within the normal range.

Virtualize Embodiment of the Invention

Figure 5:
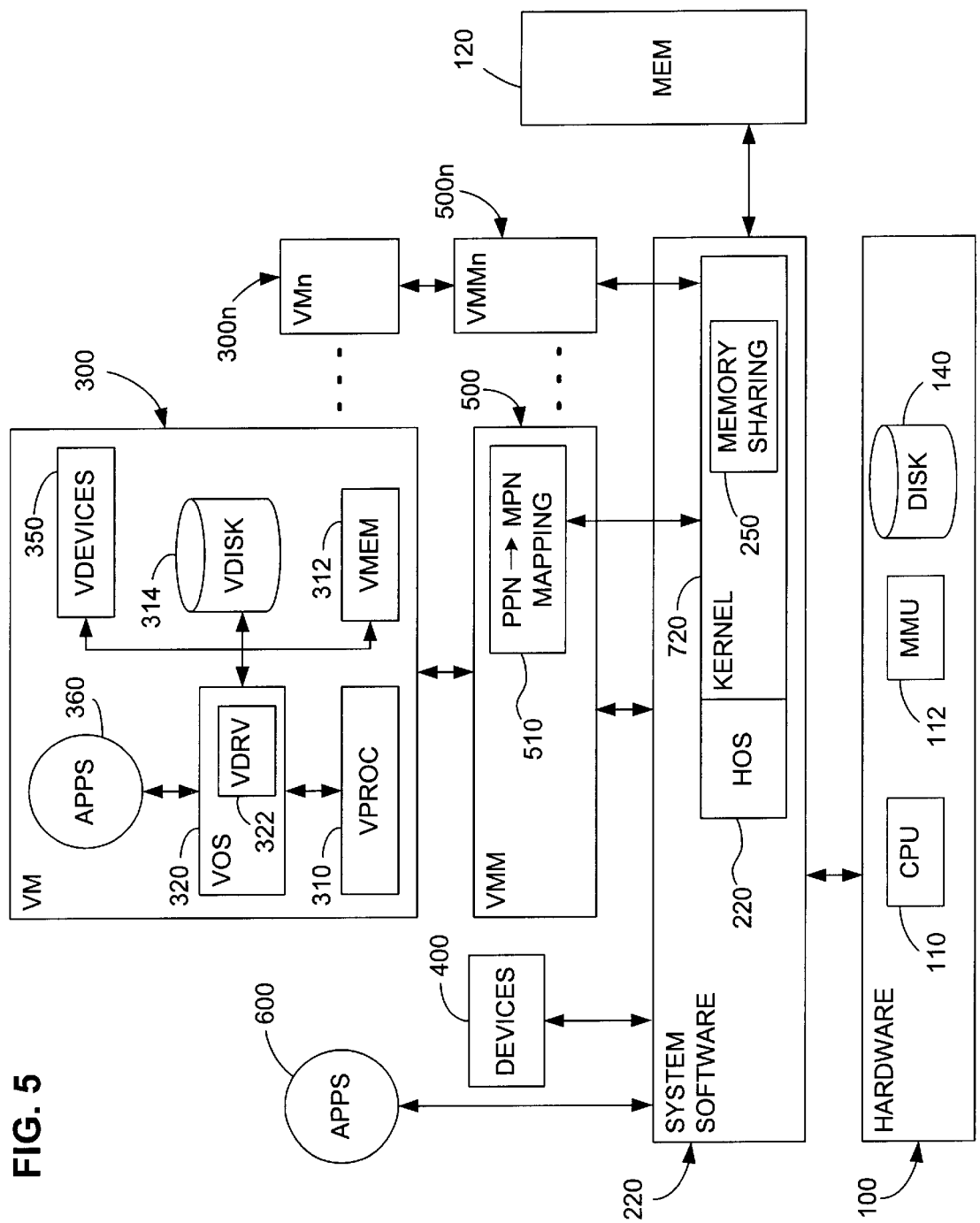
FIG. 5 is a block diagram that is similar to FIG. 1, but in which the system includes a plurality of virtual machines that are enabled to share memory pages transparently.

In the preferred embodiment of the invention, the contexts are virtual machines (VMs). This embodiment is illustrated in FIG. 5, in which structures that have already been described retain the same reference numbers.

In the preferred embodiment of the invention, at least one virtual computer 300, . . . , 300n, usually referred to in computer science as a "virtual machine" (VM), is installed to run as a guest on the host system hardware and software. As is well known in the art, a VM is a software abstraction—a "virtualization"—of an actual physical computer system. As such, each VM 300 will typically include one or more virtual CPUs 310 (VPROC), a virtual operating system 320 (VOS) (which may, but need not, simply be a copy of a conventional, commodity OS), and virtual system memory 312 (VMEM), a virtual disk 314 (VDISK), virtual peripheral devices 350 (VDEVICES) and drivers 322 (VDRV) for handling the virtual devices 350, all of which are implemented in software to emulate the corresponding components of an actual computer. Although the key components of only one VM 300 are illustrated in FIG. 1 and discussed below, the structure of any other VMs will be essentially identical.

Of course, most computers are intended to run various applications, and VMs are usually no exception. Consequently, by way of example, FIG. 5 illustrates a group of applications 360 (which may be a single application) installed to run at user level on the VOS 320; any number of applications, including none at all, may be loaded for running on the VOS, limited only by the requirements of the VM. If the VM is properly designed, then the applications (or the user of the applications) will not "know" that they are not running directly on "real" hardware. Of course, all of the applications and the components of the virtual machine 300 are instructions and data stored in memory, just as any other software. The concept, design and operation of virtual machines are well known in the field of computer science.

Virtual Machine Monitors

Some interface is usually required between a VM and the underlying "real" OS 220 (real in the sense of being either the native OS of the underlying physical computer, or the OS or other system-level software that handles actual I/O operations, takes faults and interrupts, etc.) and hardware, which are responsible for actually executing VM-issued instructions and transferring data to and from the actual, physical memory and storage devices 120, 140. This interface is often referred to as a virtual machine monitor (VMM).

A VMM is usually a thin piece of software that runs directly on top of a host, or directly on the hardware, and virtualizes all, or at least some subset of, the resources of the machine. The interface exported to the respective VM is the same as the hardware interface of the machine, or at least of some predefined hardware platform, so that the virtual OS cannot determine the presence of the VMM. The VMM also usually tracks and either forwards (to the OS 220) or itself schedules and handles all requests by its VM for machine resources as well as various faults and interrupts. The general features of VMMs are known in the art and are therefore not discussed in detail here.

In FIG. 5, VMMs 500, . . . , 500n, are shown, acting as interfaces for their respective attached VMs 300, . . . , 300n. It would also be possible to include each VMM as part of its respective VM, that is, in each virtual system. Moreover, it would also be possible to use a single VMM to act as the interface to all VMS, although it will in many cases be more difficult to switch between the different contexts of the various VMs (for example, if different VMs use different virtual operating systems) than it is simply to include a separate VMM for each VM. The important point is simply that some well-defined, known interface should be provided between each virtual system 300, . . . , 300n and the underlying system hardware 100 and software 220.

In some conventional systems, VMM's VMMs run directly on the underlying system hardware 100, and will thus act as the "real" operating system for its associated VM. In other systems, the HOS 220 is interposed as a software layer between VMM's VMMs and the hardware. Still other arrangements are possible, one of which is discussed below and is illustrated in FIG. 5. Each VMM will typically include other software components such as device emulators that emulate the characteristics of respective physical devices. Such components, and others such as an interrupt handler, etc., are common in VMMs but are not necessary to implement this invention and are therefore not illustrated or described here.

One advantage of virtualization is that each VM can be isolated from all others, and from all software other than the VMM, which itself will be transparent to the VM; indeed, the user of a VM will usually be completely unaware that it is not a "real" computer. In the context of this invention, another advantage is that each VM will operate completely within a virtual address space that is defined by the VMM. As a result, a change in mapping of physical addresses can be accomplished in a manner that is transparent to the VM, and that does not require modifications to the underlying guest operating system. The memory sharing module 250 in this virtualized embodiment of the invention is therefore preferably located within a system-level software kernel 720, so that it will be able to set up page sharing not only for different applications within a single VM, but also between different VMs.

The kernel may be configured to function simply as a common interface between all VMMs and the HOS 220. However, the kernel 720 may instead be configured so as to act as and thus effectively to replace the HOS itself with respect to scheduling of system resources and interrupt handling. In FIG. 5, the kernel 720 is shown as being a part of system software 220 along with the HOS 220 merely for the sake of illustration; both configurations are possible according to the invention.

In the following description of the invention, merely for the sake of simplicity, only one VMNMM pair is discussed. The discussion applies equally, however, to all such VMNMM pairs that may be included in any given implementation of the invention.

Applications 360 (and any other virtual component that runs on the VOS) typically address virtual memory, just as in a "real" computer. As is mentioned above, the VOS then maps these virtual page numbers VPN to what it "believes" are machine page numbers, but which actually are not. An additional mapping must therefore take place in order to associate a given VPN with the actual machine memory page MPN. The VPN-to-PPN mapping takes place within the VM. For the purposes of this invention, the most important component of the VMM is thus a memory mapping module 510 that maintains a PPN-to-MPN map, which may be designed as any other memory page map. When a VMM requests possible sharing of a page, it therefore knows and can pass to the sharing module 250 not only the CPN (in this case, the PPN), but also the corresponding MPN, just as in the non-virtualized embodiment of the invention.

The kernel processes a request to share a page from a VMM by first ensuring that the page is not currently in use by the kernel itself, that is, the active target of network or disk I/O. If the page is actively being used, then the request for sharing simply fails, and can be tried again later. Once the kernel has determined that the page is inactive, then the memory sharing module 250 hashes the page contents and produces the key as described above. As before, this key is used to search the hash table data structure for a match, that is, entering at the chain element, it examines the full keys in each frame in turn until it either finds a match or reaches the end of the linked list of frames. If a matching full key is found, then the contents of the page with the matching key are compared with the contents of the machine page MPN indicated in the frame in order to confirm a true full-content match as described above. If the page contents are found to match, then the CPN-to-MPN mapping for the current candidate page is changed to point to the MPN from the matching entry, and the candidate's original MPN is reclaimed, thus freeing the duplicate page.

The sharing procedure in the virtualized embodiment of the invention is therefore essentially the same as in the non-virtualized embodiment, except for the added degree of indirection caused by the intermediate mapping PPN-to-MPN. Even so, as is pointed out above, virtualization has several advantages.

Locking

VMM's VMMs may be concurrently attempting to share pages via the kernel. A lock is therefore needed for mutual exclusion to protect the hash table data structure. A single lock may be used to protect all page-sharing state, but such a single lock could potentially be a bottleneck. Since the chains in the hash table are independent, one alternative would be to use a lock per chain. This solution would, however be costly in terms of space. An intermediate locking granularity may therefore be implemented using a smaller array of locks (with each lock covering many chains) based on low-order or other predetermined hash key bits, for example sixteen locks using four bits. This would help reduce contention, and the number of locks can be increased to further reduce any bottlenecks. A separate lock (or set of locks) may then be implemented for frame allocation and deallocation operations.

Higher-Level Policies and Heuristics

Given the basic content-based copy identification and COW sharing mechanisms according to the invention, a variety of higher-level policies can be used to drive the overall sharing process. In particular, different approaches can be used to decide when and where the system should look for copies, and which components should initiate attempts to share. Many variations and extensions are possible.

A heuristics module 258 is therefore preferably included in order to implement the optimizations that the heuristics discussed below provide. This module may be designed using known programming techniques given the description below of its function. Note that different heuristics may be applied at different stages of the sharing procedure. Thus, some of the heuristics involve identifying likely candidate pages before any hashing takes place. Other heuristics, however, will be useful only after hashing has taken place. Either type or both types of heuristic steps may be included in implementations of the invention.

Initiation of Sharing Attempts

There are several alternatives for deciding when and how often to scan for copies. This is effectively a time-space trade off, and different solutions may be appropriate for different systems or workloads. One simple approach is to scan for copies during idle time, for example, by adding this function to the main idle loop code typically found within operating systems. This has the benefit of reducing memory usage over time while consuming only spare processor cycles. Another option is to specify a rate or fraction of the processor that should be devoted to scanning for copies (for example, 0.5% of total CPU time). An adaptive policy could, alternatively, dynamically change the scan rate based on the success rate of locating copies (for example, the fraction of scanned pages that are successfully shared).

One approach is for the memory sharing module 250 to periodically scan Ad pages in the system memory in order to identify copies. For example, pages could be considered in any sequential or heuristic (such as pages marked read-only by the guest OS) or even random order. Their contents would then be hashed, with the hash value being used as the lookup key into the hash table 254 as described above.

In the virtualized embodiment of the invention, each VMM may, for example, select its own pages (PPNs) randomly at a fixed rate. In one prototype of the invention, for example, each VMM randomly selected p pages per second, where p was a user-configurable parameter set at 50. A selected page is then made a candidate for sharing if it is not already shared and it is not currently "pinned" to a given MPN, that is, with a fixed PPN-to-MPN mapping; other conditions may of course also be imposed to qualify or disqualify pages as "prospects" for sharing. The VMM then issues a request to the kernel asking it to attempt to share the page, if possible. Note that such a request will be synchronous request, so that the VMM and its corresponding VM are blocked pending a reply. This means in turn that the VM is guaranteed not to be accessing the page while it is being considered as a sharing candidate.

Identification of Good Sharing Candidates

One advantage of the invention is that no specific information is required concerning the contexts themselves in order for the invention to operate properly. If such information is available, however, it can be exploited to allow the invention to focus on pages that are more likely to contain identical copies.

If the system could determine that a page will soon need to be modified, for example, then it would in most cases be more efficient simply to not share that page, since otherwise a private copy would soon need to be created anyway. In other words, if a COW fault is likely to be generated soon after the page is shared, then it would be better not to go through the comparison and remapping steps at all.

The problem remains how the system is to determine which pages are likely to be modified soon, and just what is meant by "soon." "Soon" need not be defined precisely, but may be chosen using any heuristic. It is relatively unlikely, for example, that executable code in standard programs will ever be modified by any context.

Some examples of page characteristics that the system may consider not only an to decide where and in which order to look for potential copies of pages, which can then be shared, but also to identify pages that should not be shared at all, include:

pages which contain code that has been executed
pages marked read-only by the guest OS
pages that were recent direct memory access (DMA) targets for disk reads
pages that were recent DMA targets for network reads
pages in particular address ranges Likely "prospect" pages may be identified as such in any known manner. For example, a "prospect indication" could be stored in a dedicated data structure in the memory mapping module 510 in each VMM, or as an additional structure within the memory sharing module 250.

Whether or not a match of page contents is immediately found, it may be preferable to defer marking pages COW until there is some evidence that the page is likely to remain read-only for some period of time. For example, the system could maintain a list or queue, for example, within the heuristics module 258, of previous candidate pages, and rehash the corresponding page contents at a later time (for example, according to a set schedule, or during times when the contexts are idle), inserting them into the table only if the hash remains the same. Many other variants of such an "aging" policy are possible.

It may also be useful to store a set of known hash values for page contents that are "good," that is, highly probable, sharing candidates. For example, hash values could be pre-computed for all code and read-only data pages in popular versions of operating systems and applications. When the contents of a page are hashed, a match in this set of "good candidates" would serve as evidence that the page is likely to remain read-only. A "Bloom filter" data structure would be particularly well suited to (statistically) maintaining the members of this set in a compact form. Bloom filters are well known in the literature.

Avoidance of Cow for Unshared Pages

In actual implementations of the invention, other than the special case of the page containing all zeroes, many and, sometimes, most pages will never need to be shared. Indeed, in the degenerate, worst-case scenario, each page will be unique. If the basic embodiment of the invention were implemented here, then every page considered as a sharing candidate would give rise to a new frame, and the corresponding MPN would be marked COW. Any attempt to write to any previously hashed candidate page would therefore lead to the creation of a private copy of the page, even though the page is not yet actually being shared. In this case, the system might therefore end up marking pages COW even where there is no immediate or even foreseeable need for sharing. Such aggressive COW marking could therefore lessen and indeed could theoretically even outweigh the benefits that the invention otherwise provides. One way to improve the performance of the system is therefore to avoid aggressively adding COW traces for unshared pages for which there are entries in the hash table.

Instead, a frame with a single reference (for example, the first page that hashes to a given key) may be marked as a speculative "hint" frame. On a subsequent full hash key match between the first page and a second page, the first page is rehashed to determine whether its hash value has changed. If the hash value has not changed, then a frame for the second page is added, the second page is marked COW, and a "hint match" condition is signaled to indicate that the system should retry sharing the first page. According to this optimization, the first page is thus marked COW only after a second page hashes to the same full key. Similarly, a "hint stale" condition can be signaled if the first page was modified and its hash key has become incorrect. A stale hint is then preferably removed from the hash table.

Marking a hash table frame with a hint can thus defer the need to mark the corresponding page COW. Rather, when a subsequent page hashes to the same index, and the system detects the existing hint, then and only then does the system need to perform a full comparison. If there is a match, then both pages can be shared and the hint can be removed.

The presence of a "hint" can be indicated in any known manner, for example, by including a single "hint flag" bit in the frame. In order to retry sharing for a given context page, the system must be able to identify it; some back-map is therefore needed in order to identify that page given only the frame and the MPN it indicates. In one prototype of the invention, a hint was indicated by the condition nrefs=0 and a "backmap" reference to the first page that hashed to the frame was also included in the frame in order to allow identification of and rehashing of that page.

Memory Protection Alternatives

Depending on the hardware architecture, it may be possible to use other memory protection mechanisms in addition to (or instead of) the ordinary read-only page mapping technique described above. For example, the Intel IA32 architecture provides memory type range registers (MTRRs) that enable properties to be specified for ranges of physical memory. In system with this hardware architecture, the "write-protected" (WP) property could then be used to protect regions containing sets of shared pages. When used in conjunction with ordinary read-only page mappings, this would provide an extra level of protection that would, for example, guard against bugs in the VM software itself.

Alternative Hash Table Structures

In the preferred embodiment of the invention described above, opportunities for sharing pages are detected via the hash table: In the basic embodiment of the invention, if the contents of different pages hash to the same index, then they are compared in full. If their contents are identical, then one copy is shared. The hash table itself is arranged as chains (also known in the literature as "hash table buckets") whose elements are the entry points for linked lists of frames, where each list has entries relating to the pages that hashed to the chain element index. Other hash table structures may, however, be used instead and will be familiar to skilled computer programmers. For example, the hash table may be implemented using the technique known as "open addressing."

Alternatives to the Hash Table

A hash table is a data structure with several well-known advantages. Assuming a hash function with good statistical properties, one advantage of the hash table used in the preferred embodiment of the invention is that it will quickly identify potential page matches by comparing a page's full hash key with relatively few frames per chain (bucket). Even in the preferred embodiment in which hashing is used to provide a fast initial evaluation of the likelihood that two pages have identical contents, a hash table is not, however, required in order to implement the efficient content-based, transparent page sharing made possible by this invention. All that is needed is some data structure that allows for searching based on a key. Many such structures are described in well known, standard texts such as "Introduction to Algorithms" by Thomas H. Cormen, et al., The MIT Press, Cambridge, Mass., 1990.

One alternative structure to a hash table is thus the class of data trees, including structures known in the art as height-balanced trees, binary trees, B-trees, etc.

Rather than using the key to index into the hash table, the memory sharing module 250 would in such case implement an algorithm for traversing and searching the chosen tree structure to find a previous key (stored, for example, in a tree node) that matches the key of a current context page. Another alternative data structure would be the class of lists including linked lists (sorted or unsorted), skip lists, or even simple arrays.

Cow Memory Traces

In the prototype of the invention, pages are marked COW by installing a special "write before" trace on a PPN in the virtual machine monitor (VMM) page map module 510. In particular, the page map module 510 in the prototype implements the trace by updating a corresponding page table entry (PTE) in order to mark the page as being write-protected. This implementation leverages the standard tracing facilities of a virtual machine monitor in systems that include at least one virtual machine (VM). When a COW trace fires (for example, due to a write by the VM), a private copy of the page is made, and the COW trace is removed from the copy. The PPN-to-MPN (that is, the CPN-to-MPN) mapping is then updated appropriately, and the old mapping is flushed from all caches. A private copy is also made if the page is validated for writing by the monitor itself, or explicitly pinned to a fixed MPN.

Sharing of Persistent Data Storage

As is mentioned above, the invention may be used to more efficiently manage data stored on and in all types of media and devices, including those that provide persistent storage; the main requirements are that the addresses to data stored on the medium or in the storage components can be programmably translated or mapped, and that some write-protection mechanism is made available. Accordingly, the invention may also be used for transparent, content-based sharing of units of other types of memory that are persistent, such as a disk. The main change in implementation in these cases is one of terminology more than of procedure.

Accordingly, assume that the invention is to be used to provide page sharing of units of disk storage for one or more VMs. In this case, each "context" will be one of the virtual disks 314; the virtual memory unit, corresponding to pages with VPNs, will be virtual disk blocks; the hardware memory unit, corresponding to pages with MPNs, will be blocks of the hardware disk 140; and the translation mechanism, corresponding to the mapping tables, will be the virtual disk subsystem that is included in each; VMs corresponding VMM. Hashing and content comparison can be carried out, just as described above, in the software layer—such as the kernel 720—that forms the interface between the virtual systems and the actual hardware disk. This embodiment of the invention would allow disk memory to be saved both within a single virtual disk, as well as across multiple virtual disks.

As another example, assume that the invention is to be used in a traditional, that is, non-virtualized system. Even here the procedure will be analogous to that described above. In this case, the contexts could be files; file blocks would be analogs to the virtual. memory units; hardware disk blocks would be the analogs to the hardware memory units; and the host operating system's file system (such as the I-nodes in Unix-based systems, which is analogous to a page table) would correspond to an address-translation mechanism.

Hybrid Environments

Page sharing according to the invention is described above with respect to either a virtualized environment, or a traditional environment. The invention may also be used in "mixed" or "hybrid" environments, in which contexts include both virtual machines and non-virtualized contexts such as applications 600 (see FIG. 5) that are also running on the same system software 220.

Multiple Sharing Mechanisms

In the embodimerits of the invention described above, all context pages (CPNs) with identical contents are mapped to a single hardware machine page (MPN). In some cases it may be advantageous to partition the context pages with identical contents into multiple sets, each of which is mapped to a distinct MPN.

For example, suppose five context pages CPN1, CPN2, CPN3, CPN4, and CPN5 all have identical contents. In the basic embodiment, each would be mapped to a single shared machine page, MPN1. An alternative would be to map disjoint subsets of the context pages to different MPNs with identical contents. For example, one such partitioning would be:

{CPN1, CPN3, CPN5}→MPN1
{CPN2, CPN4}→MPN2.

Note that this redundancy reduces the number of pages that can be reclaimed, so this technique may be most useful or practical only for heavily shared pages.

One example of when multiple sharing might be desirable is in the hybrid environment described above: Separate sharing mechanisms could be included for each of the virtualized and non-virtualized contexts in order to retain full isolation of the VMs from the non-virtualized portions of the system. Other examples of when including multiple sharing mechanisms may be useful include, for example, supporting page coloring, reducing memory latency in NUMA multiprocessors, and providing extra security. These examples are discussed here separately.

Page Coloring Effects on Cache Interference

Most computer systems include a small, high-speed hardware cache of system memory in order to exploit locality in memory accesses. In many cache architectures, the cache index consists of the low-order bits of the machine memory address. For a sufficiently large cache, the low-order bits of the page number (MPN) are the same as the high-order bits of the cache index. This effectively divides the machine memory pages into a set of classes, called "colors," so that each entry in the cache can refer to contention for regions of the cache. Page coloring is well known in the literature.

One side effect of transparent page sharing is that it may not preserve the color of the original context page. For example, suppose that the original (redundant) MPNs associated with context pages CPN1, CPN3, and CPN5 have color A, while those associated with CPN2 and CPN4 have color B. In the basic embodiment of the invention, these will all be mapped to a single MPN1, which has color A. In this case, the original page colors for CPN2 and CPN4 would not be preserved, and this could possibly impact cache contention and result in a loss of performance.

In such a page-coloring environment, the page sharing mechanism described above could take page colors into account by attempting to preserve page colors when possible. In the example, two replicated identical machine pages could be retained: MPNI with color A, and MPN2 with color B, with context mappings {CPN1, CPN3, CPN5}→MPN1 and {CPN2, CPN4}→MPN2 instead of the single mapping {CPN1, CPN2, CPN3, CPN4, CPN5}→MPN1.

Memory Latency in Numa Multiprocessors

Some multiprocessor architectures exhibit a non-uniform memory access (NUMA) property, in which the latency of a memory access differs depending on the particular memory module that is accessed. For example, a group or cluster of processors may be physically closer to particular memory modules, so that the latency of accessing a "local" module is much lower than that of a "remote" module. NUMA architectures are well known in the literature.

In this configuration, one side effect of transparent page sharing according to the invention is that it may not preserve the physical memory module locality of the original context page. For example, suppose that the original (redundant) MPNs s associated with context pages CPN1, CPN3, and CPN5 are located at memory module A, while those associated with CPN2 and CPN4 are located at memory module B. In the basic embodiment of the invention, these will all be mapped to a single MPN1, at memory module A. In this case, the original memory modules for associated with CPN2 and CPN4 are not preserved, which may lead to an impact on memory latency and resulting loss in performance.

The page sharing mechanism according to the invention may in such cases also take memory module locality into account by attempting to preserve local access when possible. In the example, two replicated identical machine pages could be retained: MPNL located at module A, and MPN2 located at module B, with context mappings {CPN1, CPN3, CPN5}MPN1 and {CPN2, CPN4}→MPN2 instead of {CPN1, CPN2, CPN3, CPN4, CPN5}→MPN1.

Extra Securyty Measures

In many embodiments of the invention (such as the preferred virtualized embodiment), contexts are securely isolated from one another. On the other hand, it is possible that some implementations of the invention may not have strict isolation between contexts. Some high-security environments may, however, have stricter requirements for isolating contexts into various security classifications, such as "unclassified," "confidential," and "secret." It may in such cases be desirable to allow sharing only among certain classes of contexts; replicated identical machine pages could then be retained for each class.

Related Work: Zero Compression

A different yet related technique is zero page compression, in which all "empty" pages containing only zero bytes can be reclaimed. If a reclaimed empty page is subsequently referenced, the system can easily allocate a zero-filled page on demand. This technique can be surprisingly effective, since many operating systems zero unused pages. The VMware ESX Server 1.0, for example, contains such a zero compression feature that will automatically reclaim empty pages from a VM when the VM would otherwise block waiting for more memory to become available.

A related technique, outside the context of virtual machines, is used for a modified Linux RAMdisk driver on the Itsy handheld computer, as described in: Bartlett, et al., "The Itsy Pocket Computer", Research report 2000/6, Compaq Western Research Lab, Palo Alto, Calif. (USA), October 2000, a revised version of which may be found in IEEE Computer, April 2001.

Page sharing according to the invention has an advantage over the zero-compression, even when only empty pages are considered: Page sharing allows VMs to read from an empty page, and makes a private copy for a VM only if and when it attempts to write to it. Simple zero compression as used in the prior art mentioned above, does not use a COW mechanism, and so must create a private copy if an empty page is accessed in any way, that is, for both reads and writes. Page sharing thus supports read-sharing of zero pages efficiently, while zero compression does not.

Performance Example

One working prototype of the invention exported an interface for configuring page sharing parameters and querying status information. The output given below is a snapshot taken when running the invention on a private build of VMware ESX Server running on a dual-processor x86 platform with support for page sharing and with the speculative hint frame optimization procedure described above.

In the test from which this snapshot was taken, three VMs were each running from a non-persistent virtual disk and using Windows 2000 as the VOS. Two of the As were configured for 128 MB memory, the remaining VM being configured for 64 MB. Each VM ran a simple workload consisting of the Microsoft Internet Explorer web browser, Windows Task Manager, and a command prompt window. Each VMM used a randomized policy to select candidate pages for sharing, and scanned pages at a maximum rate of 50 pages per second.

The overhead required to use the invention in this test was as follows:

| OVERHEAD | | | |
| --- | --- | --- | --- |
| name | count | pages | KB |
| chains | 131072 | 97 | 388 |
| frames | 112640 | 441 | 1764 |
| total | | 538 | 2152 |

The status of various parameters at the time of the snapshot was as follows:

| STATUS | | | | |
| --- | --- | --- | --- | --- |
| name | pages | MB | % track | % used |
| used | 81919 | 319 | — | — |
| track | 78143 | 305 | 100 | 95 |

-continued

| name | pages | STATUS MB | % track | % used |
|---|---|---|---|---|
| cow | 58770 | 229 | 75 | 71 |
| cow1 | 244 | 0 | 0 | 0 |
| hint | 19373 | 75 | 24 | 23 |
| unique | 36194 | 141 | 46 | 44 |
| shared | 41949 | 163 | 53 | 51 |

One can see that, when the snapshot was taken, there were 75 MB worth of pages marked with hints. The parameter "track" indicates how many pages were examined by the page sharing subsystem. At the time of this snapshot, 95% (78,143) of all 81,919 pages were being tracked; 41,949 of the tracked pages were being shared, the rest (36,194) of which were unique. The "cow1" statistic indicates the number of pages in the hash table that were marked COW (shown as the "cow" parameter) but that had a reference count nrefs=1; there were fewer than 1 MB of such pages, since most unshared pages were maintained as hints. Note that, overall, more than half of all used pages were reclaimed, for a net savings of 51% of all used memory.

The snapshot also included a list of the eight most heavily shared pages. Of the 15,686 pages that were involved in sharing one of these eight, fully 14,310, that is, slightly more than 91%, were pages containing all zeros. Zero pages made up only around 34% of all shared pages, however, so that roughly two-thirds of all reclaimed pages were non-zero pages. Other pages with known contents were those containing all ones (78, or about 0.5%), as well as several dozen copies of pages containing Windows environment variables.

What is claimed is:

1. In a computer system that includes a hardware memory and at least one context, which has a virtual memory that is divided into a plurality of virtual memory units that are mappable to corresponding hardware memory units, a method comprising the following steps:

selecting candidate memory units from among the virtual memory units;

identifying virtual memory units that have contents identical to those of the candidate memory units; and mapping those virtual memory units identified as having identical contents to a single instance of a corresponding one of the hardware memory units in which:

the step of identifying virtual memory units that have identical contents includes the following sub-steps:

calculating a hash value by applying a hash function to the contents of a current one of the candidate memory units;

searching a data structure to determine the presence of a previous data structure entry corresponding to the calculated hash value;

if a previous entry is not present in the data structure, inserting into the data structure a new entry corresponding to the current candidate memory unit; and if a previous entry is present in the data structure, comparing the entire contents of the current candidate memory unit with the contents of the single instance indicated by the previous entry.

2. A method as in claim 1, in which the data structure is a hash table.

3. A method as in claim 1,
in which the step of mapping the virtual memory units having identical contents further comprises write-protecting selected ones of the virtual memory units that are mapped to the single instance.

4. A method as in claim 3, which any and all of the virtual memory units that are mapped to the single instance are write-protected.

5. A method as in claim 3, further including the following steps:

sensing a request by any context to write to any write-protected virtual memory unit and, upon sensing such request, for the requesting context, generating in the hardware memory a private copy of the write-protected virtual memory unit; and remapping the write-protected virtual memory unit to the private copy.

6. A method as in claim 3, further comprising the step of identifying virtual memory units that have a relatively high probability of impending modification.

7. A method as in claim 6, further comprising the following steps:

designating as temporarily non-sharable the virtual memory units that have the relatively high probability of impending modification; and deferring the step of mapping to the single instance for the temporarily non-sharable virtual memory units.

8. A method as in claim 6, further comprising the following steps:

designating as temporarily non-sharable the virtual memory units that have the relatively high probability of impending modification; and deferring the step of write-protecting each temporarily non-sharable virtual memory unit until a subsequent identification of a different one of the virtual memory units having contents identical to the respective temporarily non-sharable virtual memory unit.

9. A method as in claim 3, further comprising deferring the step of write-protecting each virtual memory unit for which no other virtual memory unit has yet been identified as having identical contents.

10. A method as in claim 1, in which the step of identifying virtual memory units that have identical contents comprises randomly selecting the virtual memory units for content comparison with at least one other of the virtual memory units.

11. A method as in claim 1, in which the step of identifying virtual memory units that have identical contents comprises selecting the virtual memory units for content comparison with at least one other of the virtual memory units according to a predetermined heuristic criterion.

12. A method as in claim 1, in which the step of identifying virtual memory units is performed during a system idle time.

13. A method as in claim 1, in which at least one context is a virtual machine.

14. A method as in claim 1, in which at least one context is a virtual disk.

15. A method as in claim 1, in which the step of identifying virtual memory units that have identical contents comprises the step of comparing the contents of each of the virtual memory units with the contents of each of the other virtual memory units.

16. A method as in claim 1, further comprising the following steps:
 partitioning the virtual memory units into a plurality of classes; and
 performing the step of identifying virtual memory units that have identical contents and the step of mapping those virtual memory units to a single shared instance of a corresponding hardware memory unit separately and independently for each of the classes,
 sharing single instances of the hardware memory units thereby taking place only among virtual memory units in the same class.

17. A method as in claim 16, in which the classes are page colors of the hardware memory units to which the corresponding virtual memory units are currently mapped.

18. A method as in claim 16, in which the computer system further has a multiprocessor architecture with a non-uniform memory access property and a plurality of memory modules having different access latency, and in which the classes are the memory modules to which the corresponding virtual memory units are currently mapped.

19. A method for sharing memory in a computer system comprising:
 installing in the computer system at least one virtual machine that comprises:
  at least one address space that is divided into a plurality of virtual memory units; and
  a virtual operating system that maps each virtual memory unit to a corresponding intermediate memory unit;
 selecting candidate memory units from among the intermediate memory units;
 for each virtual machine, maintaining in a virtual machine monitor an intermediate mapping that maps each intermediate memory unit to a corresponding hardware memory unit of a hardware memory;
 identifying intermediate memory units that have identical contents by hashing the contents of the candidate memory units; and
 via the intermediate mapping, mapping those intermediate memory units identified as having identical contents to a single instance of a corresponding one of the hardware memory units;
 in which the step of identifying intermediate memory units that have identical contents further includes the following sub-steps:
 calculating a hash value by applying a hash function to the contents of a current one of the candidate memory units;
 searching a data structure to determine the presence of a previous data structure entry corresponding to the calculated hash value;
 if a previous entry is not present in the data structure, inserting into the data structure a new entry corresponding to the current candidate memory unit; and
 if a previous entry is present in the data structure, comparing the entire contents of the current candidate memory unit with the contents of the single instance indicated by the previous entry.

20. A method as in claim 19, in which the data structure is a hash table.

21. A method as in claim 19,
 in which the step of mapping the intermediate memory units having identical contents further comprises write-protecting selected ones of the intermediate memory units that are mapped to the single instance.

22. A method as in claim 21, in which any and all of the intermediate memory units that are mapped to the single instance are write-protected.

23. A method as in claim 21, further including the following steps:
 sensing a request by any context to write to any write-protected intermediate memory unit and, upon sensing such request,
  for the requesting context, generating in the hardware memory a private copy of the write-protected intermediate memory unit; and
  remapping the write-protected intermediate memory unit to the private copy.

24. A method as in claim 21, further comprising the step of identifying intermediate memory units that have a relatively high probability of impending modification.

25. A method as in claim 24, further comprising the following steps:
 designating as temporarily non-sharable the intermediate memory units that have the relatively high probability of impending modification; and
 deferring the step of mapping to the single instance for the temporarily non-sharable intermediate memory units.

26. A method as in claim 24, further comprising the following steps:
 designating as temporarily non-sharable the intermediate memory units that have the relatively high probability of impending modification; and
 deferring the step of write-protecting each temporarily non-sharable intermediate memory unit until a subsequent identification of a different one of the intermediate memory units having contents identical to the respective temporarily non-sharable intermediate memory unit.

27. A method as in claim 21, further comprising deferring the step of write-protecting each intermediate memory unit for which no other intermediate memory unit has yet been identified as having identical contents.

28. A method as in claim 19, in which the step of identifying intermediate memory units that have identical contents comprises randomly selecting the intermediate memory units for content comparison with at least one other of the intermediate memory units.

29. A method as in claim 19, in which the step of identifying intermediate memory units that have identical contents comprises selecting the intermediate memory units for content comparison with at least one other of the intermediate memory units according to a predetermined heuristic criterion.

30. A method as in claim 19, in which the step of identifying intermediate memory units is performed during a system idle time.

31. A method as in claim 19, in which the step of identifying intermediate memory units that have identical contents comprises the step of comparing the contents of each of the intermediate memory units with the contents of each of the other intermediate memory units.

32. A method as in claim 19, further comprising the following steps:
 partitioning the intermediate memory units into a plurality of classes; and
 performing the step of identifying intermediate memory units that have identical contents and the step of mapping those intermediate memory units to a single shared instance of a corresponding hardware memory unit separately and independently for each of the classes, sharing single instances of the hardware memory units thereby taking place only among intermediate memory units in the same class.

33. A method as in claim 32, in which the classes are page colors of the hardware memory units to which the corresponding intermediate memory units are currently mapped.

34. A method as in claim 32, in which the computer system further has a multiprocessor architecture with a non-uniform memory access property and a plurality of memory modules having different access latency, and in which the classes are the memory modules to which the corresponding intermediate memory units are currently mapped.

35. In a computer system that includes a hardware memory and at least one context, which has a virtual memory that is divided into a plurality of virtual memory units that are mappable to corresponding hardware memory units, a method comprising the following steps:

A) identifying virtual memory units that have identical contents; and

B) mapping those virtual memory units identified as having identical contents to a single instance of a corresponding one of the hardware memory units;

in which:

C) the step of identifying virtual memory units that have identical contents includes the following sub-steps:
  i) selecting candidate memory units from among the virtual memory units;
  ii) calculating a hash value by applying a hash function to the contents of a current one of the candidate memory units;
  iii) searching a hash table to determine the presence of a previous hash table entry corresponding to the calculated hash value and
    a) if a previous entry is not present in the hash table, inserting into the hash table a new entry corresponding to the current candidate memory unit; and
    b) if a previous entry is present in the hash table, comparing the entire contents of the current candidate memory unit with the contents of the single instance indicated by the previous entry;

D) write-protecting selected ones of the virtual memory units that are mapped to the single instance; and E) sensing a request by any context to write to any write-protected virtual memory unit and, upon sensing such request, for the requesting context, generating in the hardware memory a private copy of the write-protected virtual memory unit and remapping the write-protected virtual memory unit to the private copy.

36. A method for sharing memory in a computer system comprising:

A) installing in the computer system at least one virtual machine that comprises:
  i) at least one address space that is divided into a plurality of virtual memory units; and
  ii) a virtual operating system that maps each virtual memory unit to a corresponding intermediate memory unit;

B) for each virtual machine, maintaining in a virtual machine monitor an intermediate mapping that maps each intermediate memory unit to a corresponding hardware memory unit of a hardware memory;

C) identifying intermediate memory units that have identical contents; and

D) via the intermediate mapping, mapping those intermediate memory units identified as having identical contents to a single instance of a corresponding one of the hardware memory units;

in which:

D) the step of identifying intermediate memory units that have identical contents includes the following sub-steps:
  i) selecting candidate memory units from among the intermediate memory units;
  ii) calculating a hash value by applying a hash function to the contents of a current one of the candidate memory units;
  iii) searching a hash table to determine the presence of a previous hash table entry corresponding to the calculated hash value and
    a) if a previous entry is not present in the hash table, inserting into the hash table a new entry corresponding to the current candidate memory unit; and
    b) if a previous entry is present in the hash table, comparing the entire contents of the current candidate memory unit with the contents of the single instance indicated by the previous entry;

E) write-protecting selected ones of the intermediate memory units that are mapped to the single instance; and F) sensing a request by any context to write to any write-protected virtual memory unit and, upon sensing such request, for the requesting context, generating in the hardware memory a private copy of the write-protected virtual memory unit and remapping the write-protected virtual memory unit to the private copy.

37. A computer system comprising:

a hardware memory;

at least one context, which has a virtual memory that is divided into a plurality of virtual memory units that are mappable to corresponding hardware memory units; and a memory sharing module comprising computer-executable code for identifying virtual memory units that have identical contents and for mapping those virtual memory units identified as having identical contents to a single instance of a corresponding one of the hardware memory units in which:

the memory sharing module includes:
  a candidate selection sub-module for selecting candidate memory units from among the virtual memory units; and
  a hashing sub-module or hashing the contents of the candidate memory units;

the hashing module is further provided for calculating a hash value by applying a hash function to the contents of a current one of the candidate memory units and for searching a data structure to determine the presence of a previous data structure entry corresponding to the calculated hash value; and the memory sharing module is further provided for inserting into the data structure a new entry corresponding to the current candidate memory unit if a previous entry is not present in the data structure; and for comparing the entire contents of the current candidate memory unit with the contents of the single instance indicated by the previous entry if a previous entry is present in the data structure.

38. A system as in claim 37, in which the data structure is a hash table.

39. A system as in claim 37, further comprising:
a write-protection mechanism for write-protecting selected ones of the virtual memory units that are mapped to the single instance.

40. A system as in claim 39, in which any and all of the virtual memory units that are mapped to the single instance are write-protected.

41. A system as in claim 39, in which the memory sharing module is further provided for sensing a request by any context to write to any write-protected virtual memory unit and, upon sensing such request, for the requesting context, for generating in the hardware memory a private copy of the write-protected virtual memory unit and for remapping the write-protected virtual memory unit to the private copy.

42. A system as in claim 39, in which the memory sharing module is provided for deferring the step of write-protecting each virtual memory unit for which no other virtual memory unit has yet been identified as having identical contents.

43. A system as in claim 37, in which at least one context is a virtual machine.

44. A system as in claim 37, in which at least one context is a virtual disk.

45. A system as in claim 37, in which the memory sharing module is provided for comparing the contents of each of the virtual memory units with the contents of each of the other virtual memory units.

46. A system as in claim 37, in which:
the virtual memory units are partitioned into a plurality of classes; and
the memory sharing module is further provided for identifying virtual memory units that have identical contents and for mapping those virtual memory units to a single shared instance of a corresponding hardware memory unit separately and independently for each of the classes, whereby single instances of the hardware memory units are shared only among virtual memory units in the same class.

47. A system as in claim 46, in which the classes are page colors of the hardware memory units to which the corresponding virtual memory units are currently mapped.

48. A system as in claim 46, in which the computer system further has a multiprocessor architecture with a non-uniform memory access property and a plurality of memory modules having different access latency, and in which the classes are the memory modules to which the corresponding virtual memory units are currently mapped.

49. A computer system comprising:
a hardware memory;
at least one virtual machine that comprises:
at least one address space that is divided into a plurality of virtual memory units; and
a virtual operating system including means for mapping each virtual memory unit to a corresponding intermediate memory unit;
for each virtual machine, a corresponding virtual machine monitor including intermediate mapping means for mapping each intermediate memory unit to a corresponding hardware memory unit of the hardware memory;
a memory sharing module comprising computer-executable code for identifying intermediate memory units that have identical contents, and, via the intermediate mapping means, for mapping those intermediate memory units identified as having identical contents to a single instance of a corresponding one of the hardware memory units;
in which:
the memory sharing module includes:
a candidate selection sub-module for selecting candidate memory units from among the intermediate memory units; and
a hashing sub-module for hashing the contents of the candidate memory units;
the hashing module is further provided for calculating a hash value by applying a hash function to the contents of a current one of the candidate memory units and for searching a data structure to determine the presence of a previous data structure entry corresponding to the calculated hash value; and
the memory sharing module is further provided for inserting into the data structure a new entry corresponding to the current candidate memory unit if a previous entry is not present in the data structure; and for comparing the entire contents of the current candidate memory unit with the contents of the single instance indicated by the previous entry if a previous entry is present in the data structure.

50. A system as in claim 49, in which the data structure is a hash table.

51. A system as in claim 49, further comprising:
a write-protection mechanism for write-protecting selected ones of the intermediate memory units that are mapped to the single instance.

52. A system as in claim 51, in which any and all of the intermediate memory units that are mapped to the single instance are write-protected.

53. A system as in claim 51, in which the memory sharing module is further provided for sensing a request by any virtual machine to write to any write-protected intermediate memory unit and, upon sensing such request, for the requesting virtual machine, for generating in the hardware memory a private copy of the write-protected intermediate memory unit and for remapping the write-protected intermediate memory unit to the private copy.

54. A system as in claim 51, in which the memory sharing module is provided for deferring the step of write-protecting each intermediate memory unit for which no other intermediate memory unit has yet been identified as having identical contents.

55. A system as in claim 49, in which the memory sharing module is provided for comparing the contents of each of the intermediate memory units with the contents of each of the other intermediate memory units.

56. A system as in claim 49, in which:
the virtual memory units are partitioned into a plurality of classes; and
the memory sharing module is further provided for identifying virtual memory units that have identical contents and for mapping those virtual memory units to a single shared instance of a corresponding hardware memory unit separately and independently for each of the classes, whereby single instances of the hardware memory units are shared only among virtual memory units in the same class.

57. A system as in claim 56, in which the classes are page colors of the hardware memory units to which the corresponding virtual memory units are currently mapped.

58. A system as in claim 56, in which the computer system further has a multiprocessor architecture with a non-uniform memory access property and a plurality of memory modules having different access latency, and in which the classes are the memory modules to which the corresponding virtual memory units are currently mapped.

59. In a computer system that includes a hardware memory and at least one context, which has a virtual memory that is divided into a plurality of virtual memory units that are mappable to corresponding hardware memory units, a method comprising the following steps:
   selecting candidate memory units from among the virtual memory units;
   identifying virtual memory units that have contents identical to the contents of the candidate memory units;
   identifying virtual memory units that have a relatively high probability of impending modification; and
   mapping those virtual memory units identified as having identical contents to a single instance of a corresponding one of the hardware memory units and write-protecting selected ones of the virtual memory units that are mapped to the single instance.

60. A method as in claim 59, further comprising the following steps:
   designating as temporarily non-sharable the virtual memory units that have the relatively high probability of impending modification; and
   deferring the step of mapping to the single instance for the temporarily non-sharable virtual memory units.

61. A method as in claim 59, further comprising the following steps:
   designating as temporarily non-sharable the virtual memory units that have the relatively high probability of impending modification; and
   deferring the step of write-protecting each temporarily non-sharable virtual memory unit until a subsequent identification of a different one of the virtual memory units having contents identical to the respective temporarily non-sharable virtual memory unit.

62. In a computer system that includes a hardware memory and at least one context, which has a virtual memory that is divided into a plurality of virtual memory units that are mappable to corresponding hardware memory units, a method comprising the following steps:
   partitioning the virtual memory units into a plurality of classes;
   identifying virtual memory units that have identical contents;
   mapping those virtual memory units identified as having identical contents to a single instance of a corresponding one of the hardware memory units;
   performing the step of identifying virtual memory units that have identical contents and the step of mapping those virtual memory units to a single shared instance of a corresponding hardware memory unit separately and independently for each of the classes; and
   sharing single instances of the hardware memory units thereby taking place only among virtual memory units in the same class.

63. A method as in claim 62, in which the classes are page colors of the hardware memory units to which the corresponding virtual memory units are currently mapped.

64. A method as in claim 62, in which the computer system further has a multiprocessor architecture with a non-uniform memory access property and a plurality of memory modules having different access latency, and in which the classes are the memory modules to which the corresponding virtual memory units are currently mapped.

65. A method for sharing memory in a computer system comprising:
   installing in the computer system at least one virtual machine that comprises:
      at least one address space that is divided into a plurality of virtual memory units; and
      a virtual operating system that maps each virtual memory unit to a corresponding intermediate memory unit;
   for each virtual machine, maintaining in a virtual machine monitor an intermediate mapping that maps each intermediate memory unit to a corresponding hardware memory unit of a hardware memory;
   selecting candidate memory units from among the intermediate memory units;
   identifying intermediate memory units that have contents identical to those of the candidate memory units;
   identifying intermediate memory units that have a relatively high probability of impending modification; and
   via the intermediate mapping, mapping those intermediate memory units identified as having identical contents to a single instance of a corresponding one of the hardware memory units;
   in which the step of mapping the intermediate memory units having identical contents further comprises write-protecting selected ones of the intermediate memory units that are mapped to the single instance.

66. A method as in claim 65, further comprising the following steps:
   designating as temporarily non-sharable the intermediate memory units that have the relatively high probability of impending modification; and
   deferring the step of mapping to the single instance for the temporarily non-sharable intermediate memory units.

67. A method as in claim 65, further comprising the following steps:
   designating as temporarily non-sharable the intermediate memory units that have the relatively high probability of impending modification; and
   deferring the step of write-protecting each temporarily non-sharable intermediate memory unit until a subsequent identification of a different one of the intermediate memory units having contents identical to the respective temporarily non-sharable intermediate memory unit.

68. A method for sharing memory in a computer system comprising:
   installing in the computer system at least one virtual machine that comprises:
      at least one address space that is divided into a plurality of virtual memory units; and
      a virtual operating system that maps each virtual memory unit to a corresponding intermediate memory unit;
   for each virtual machine, maintaining in a virtual machine monitor an intermediate mapping that maps each intermediate memory unit to a corresponding hardware memory unit of a hardware memory;
   partitioning the intermediate memory units into a plurality of classes;
   identifying intermediate memory units that have identical contents;
   via the intermediate mapping, mapping those intermediate memory units identified as having identical contents to a single instance of a corresponding one of the hardware memory units;

performing the step of identifying intermediate memory units that have identical contents and the step of mapping those intermediate memory units to a single shared instance of a corresponding hardware memory unit separately and independently for each of the classes; and sharing single instances of the hardware memory units thereby taking place only among intermediate memory units in the same class.

69. A method as in claim 68, in which the classes are page colors of the hardware memory units to which the corresponding intermediate memory units are currently mapped.

70. A method as in claim 68, in which the computer system further has a multiprocessor architecture with a non-uniform memory access property and a plurality of memory modules having different access latency, and in which the classes are the memory modules to which the corresponding intermediate memory units are currently mapped.

71. A computer system comprising:

a hardware memory;

at least one context, which has a virtual memory that is divided into a plurality of virtual memory units that are mappable to corresponding hardware memory units; and a memory sharing module comprising computer-executable code for identifying virtual memory units that have identical contents and for mapping those virtual memory units identified as having identical contents to a single instance of a corresponding one of the hardware memory units;

in which:

the virtual memory units are partitioned into a plurality of classes; and the memory sharing module is further provided for identifying virtual memory units that have identical contents and for mapping those virtual memory units to a single shared instance of a corresponding hardware memory unit separately and independently for each of the classes, whereby single instances of the hardware memory units are shared only among virtual memory units in the same class.

72. A system as in claim 71, in which the classes are page colors of the hardware memory units to which the corresponding virtual memory units are currently mapped.

73. A system as in claim 71, in which the computer system further has a multiprocessor architecture with a non-uniform memory access property and a plurality of memory modules having different access latency, and in which the classes are the memory modules to which the corresponding virtual memory units are currently mapped.

74. A computer system comprising:

a hardware memory;

at least one virtual machine that comprises:

at least one address space that is divided into a plurality of virtual memory units; and a virtual operating system including means for mapping each virtual memory unit to a corresponding intermediate memory unit;

for each virtual machine, a corresponding virtual machine monitor including intermediate mapping means for mapping each intermediate memory unit to a corresponding hardware memory unit of the hardware memory;

a memory sharing module comprising computer-executable code for identifying intermediate memory units that have identical contents, and, via the intermediate mapping means, for mapping those intermediate memory units identified as having identical contents to a single instance of a corresponding one of the hardware memory units;

in which:

the virtual memory units are partitioned into a plurality of classes; and the memory sharing module is further provided for identifying virtual memory units that have identical contents and for mapping those virtual memory units to a single shared instance of a corresponding hardware memory unit separately and independently for each of the classes, whereby single instances of the hardware memory units are shared only among virtual memory units in the same class.

\* \* \* \* \*

UNITED STATES PATENT AND TRADEMARK OFFICE
CERTIFICATE OF CORRECTION

| | |
|---|---|
| PATENT NO. | : 6,789,156 B1 |
| APPLICATION NO. | : 09/915045 |
| DATED | : September 7, 2004 |
| INVENTOR(S) | : Carl A. Waldspurger |

It is certified that error appears in the above-identified patent and that said Letters Patent is hereby corrected as shown below:

Title page item (73) Assignee, change

"VMWare, Inc., Palo Alto, CA (US)"

to

--VMware, Inc., Palo Alto, CA (US)--

Signed and Sealed this

Sixteenth Day of June, 2009

JOHN DOLL
*Acting Director of the United States Patent and Trademark Office*